US009354343B2

(12) United States Patent
Roberts et al.

(10) Patent No.: US 9,354,343 B2
(45) Date of Patent: May 31, 2016

(54) DECLINATION COMPENSATION FOR SEISMIC SURVEY

(75) Inventors: Phillip Roberts, Katy, TX (US); Robert Fischer, Houston, TX (US); Noel Zinn, Houston, TX (US); Curt Schneider, Houston, TX (US); Joseph R. Gagliardi, Katy, TX (US); Shawn Rice, Spring, TX (US); Timothy A. Dudley, Houston, TX (US); John Grant, Livingston (GB); Kevin Simpson, Lancaster (GB)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 13/113,216

(22) Filed: May 23, 2011

(65) Prior Publication Data

US 2012/0134234 A1    May 31, 2012

Related U.S. Application Data

(63) Continuation-in-part of application No. 12/719,783, filed on Mar. 8, 2010.

(60) Provisional application No. 61/158,698, filed on Mar. 9, 2009, provisional application No. 61/246,367, filed on Sep. 28, 2009, provisional application No. 61/267,329, filed on Nov. 14, 2009.

(51) Int. Cl.
*G01V 11/00* (2006.01)
*G01V 1/38* (2006.01)
(Continued)

(52) U.S. Cl.
CPC ... *G01V 1/38* (2013.01); *B32B 7/12* (2013.01); *B32B 21/13* (2013.01); *B32B 21/14* (2013.01);
(Continued)

(58) Field of Classification Search
CPC ....... G01V 1/38; G01V 1/003; G01V 1/3835; G01V 11/00; G01V 2210/6163; B32B 7/12; B32B 21/13; B32B 21/14; C09J 189/00; C09J 197/005; G01C 17/00; G01C 17/10; G01R 33/025

USPC ..................... 367/15–19; 33/355 R, 356, 357
See application file for complete search history.

(56) References Cited

U.S. PATENT DOCUMENTS 1,625,245 A    4/1927    Grove
1,690,578 A    11/1928    Hammond, Jr.
(Continued)

FOREIGN PATENT DOCUMENTS

EP    0154968    9/1985
FR    2496277    6/1982
(Continued)

OTHER PUBLICATIONS

Konvalin, Compensating for tilt, Hard Iron and Soft iron effect, Sensors Dec. 1 2009, http://www.sensorsmag.com/sensors/motion-velocity-displacement/compensating-tilt-hard-iron-and-soft-iron-effects-6475.*

(Continued)

*Primary Examiner* — Luke Ratcliffe
*Assistant Examiner* — Hovhannes Baghdasaryan
(74) *Attorney, Agent, or Firm* — Blank Rome LLP

(57) ABSTRACT

In seismic survey for icy waters, streamers are towed behind a vessel under the water's surface to avoid ice. GPS readings may not be consistently obtained because the ice prevents a tail buoy with a GPS receiver from trailing from streamer at the surface. Instead, a device tows on the streamer under the water's surface. The streamer's absolute position is tracked by intermittently bringing the towed device toward the surface so GPS readings can be obtained. The streamer's absolute position can then be used in conjunction with compass readings and can correlate various seismic sensor signals obtained along the streamer during the survey. The compass readings can be corrected for declination using declinometer readings, which can be compensated for iron effects from the vessel or other device carrying the declinometer.

21 Claims, 17 Drawing Sheets

(51) Int. Cl.

| | | |
|---|---|---|
| *G01V 1/00* | (2006.01) | |
| *B32B 7/12* | (2006.01) | |
| *B32B 21/13* | (2006.01) | |
| *B32B 21/14* | (2006.01) | |
| *C09J 189/00* | (2006.01) | |
| *C09J 197/00* | (2006.01) | |

(52) U.S. Cl.
CPC .............. *C09J 189/00* (2013.01); *C09J 197/005* (2013.01); *G01V 1/003* (2013.01); *G01V 1/3835* (2013.01); *G01V 11/00* (2013.01); *G01V 2210/6163* (2013.01); *Y10T 428/24066* (2015.01); *Y10T 428/31623* (2015.04); *Y10T 428/31768* (2015.04); *Y10T 428/31772* (2015.04)

(56) References Cited

U.S. PATENT DOCUMENTS

| | | |
|---|---|---|
| 2,030,768 A | 2/1936 | Shultz |
| 2,462,568 A | 2/1949 | Steckel |
| 2,556,423 A | 6/1951 | Gross |
| 2,566,029 A | 8/1951 | Louthan |
| 2,692,570 A | 10/1954 | Costa |
| 2,765,565 A | 10/1956 | Mussio |
| 3,034,471 A | 5/1962 | Aschinger |
| 3,159,806 A | 12/1964 | Piasecki |
| 3,172,510 A | 3/1965 | Lee et al. |
| 3,336,572 A | 8/1967 | Paull et al. |
| 3,354,658 A | 11/1967 | Sam |
| 3,437,987 A | 4/1969 | Burg |
| 3,497,869 A | 2/1970 | Silverman |
| 3,583,445 A | 6/1971 | Harbonn et al. |
| 3,605,668 A | 9/1971 | Morgan |
| 3,621,380 A * | 11/1971 | Barlow, Jr. .................. 324/345 |
| 3,635,186 A | 1/1972 | German |
| 3,703,876 A | 11/1972 | Michelsen |
| 3,739,736 A | 6/1973 | Carreau et al. |
| 3,744,014 A | 7/1973 | Greenlaw |
| 3,810,081 A | 5/1974 | Rininger |
| 3,886,882 A | 6/1975 | Thornburg et al. |
| 3,935,829 A | 2/1976 | Lantz |
| 4,004,265 A | 1/1977 | Woodruff et al. |
| 4,031,630 A * | 6/1977 | Fowler ............................ 33/356 |
| 4,033,277 A | 7/1977 | Schaper |
| 4,037,189 A | 7/1977 | Bell et al. |
| 4,047,579 A | 9/1977 | Wilckens et al. |
| 4,124,990 A | 11/1978 | Bell et al. |
| 4,139,074 A | 2/1979 | White |
| 4,189,703 A | 2/1980 | Bennett |
| 4,196,688 A | 4/1980 | Lipinsky, Sr. |
| 4,231,111 A * | 10/1980 | Neeley .............................. 367/19 |
| 4,276,845 A | 7/1981 | Spanner |
| 4,290,123 A | 9/1981 | Pickens |
| 4,313,181 A | 1/1982 | Holm |
| 4,314,363 A | 2/1982 | Thigpen et al. |
| 4,354,446 A | 10/1982 | Goldsmith et al. |
| 4,372,420 A | 2/1983 | White |
| 4,404,664 A * | 9/1983 | Zachariadis .................. 367/19 |
| 4,520,468 A * | 5/1985 | Scherbatskoy ................ 367/83 |
| 4,566,083 A | 1/1986 | Thigpen |
| 4,570,245 A | 2/1986 | Thigpen |
| 4,581,723 A | 4/1986 | Savit |
| 4,616,348 A | 10/1986 | Ostrander |
| 4,616,590 A | 10/1986 | Albertini et al. |
| 4,621,347 A | 11/1986 | Ostrander |
| 4,648,083 A | 3/1987 | Giallorenzi |
| 4,719,987 A | 1/1988 | George, Jr. et al. |
| 4,729,333 A | 3/1988 | Kirby et al. |
| 4,756,268 A | 7/1988 | Gjestrum et al. |
| 4,775,028 A | 10/1988 | de Heering |
| 4,798,156 A | 1/1989 | Langeland et al. |
| 4,800,831 A | 1/1989 | Hellmann et al. |
| 4,870,626 A | 9/1989 | Tveit |
| 4,992,991 A | 2/1991 | Young et al. |
| 4,998,227 A | 3/1991 | Rygg et al. |
| 5,046,055 A | 9/1991 | Ruffa |
| 5,097,788 A | 3/1992 | Castel |
| 5,113,376 A | 5/1992 | Bjerkoy |
| 5,142,505 A | 8/1992 | Peynaud |
| 5,144,588 A | 9/1992 | Johnston et al. |
| 5,157,636 A | 10/1992 | Bjerkoy |
| 5,263,431 A | 11/1993 | Wood |
| 5,305,703 A | 4/1994 | Korsgaard |
| 5,353,223 A | 10/1994 | Norton et al. |
| 5,408,441 A | 4/1995 | Barr et al. |
| 5,532,975 A | 7/1996 | Elholm |
| 5,666,900 A | 9/1997 | Carroll et al. |
| 5,676,083 A | 10/1997 | Korsgaard |
| 5,841,733 A | 11/1998 | Bouyoucos et al. |
| 5,941,746 A | 8/1999 | Isnard et al. |
| 6,012,406 A | 1/2000 | Dudley et al. |
| 6,021,577 A | 2/2000 | Shiells et al. |
| 6,046,959 A | 4/2000 | Salmi et al. |
| 6,058,072 A | 5/2000 | Abraham |
| 6,088,296 A | 7/2000 | Seaman et al. |
| 6,189,477 B1 | 2/2001 | Cody |
| 6,212,476 B1 | 4/2001 | Noy et al. |
| 6,227,310 B1 | 5/2001 | Jamieson |
| 6,467,423 B1 | 10/2002 | Poldervaart |
| 6,474,254 B1 | 11/2002 | Ambs et al. |
| 6,487,782 B1 | 12/2002 | Bond |
| 6,493,636 B1 | 12/2002 | DeKok |
| 6,504,792 B2 | 1/2003 | Barker |
| 6,525,992 B1 | 2/2003 | Olivier et al. |
| 6,532,189 B2 | 3/2003 | Barker |
| 6,606,958 B1 | 8/2003 | Bouyoucos |
| 6,683,819 B1 | 1/2004 | Estaphan et al. |
| 6,823,262 B2 | 11/2004 | Bahorich et al. |
| 6,877,237 B1 | 4/2005 | Withanawasam |
| 7,042,803 B2 | 5/2006 | Kutty et al. |
| 7,092,315 B2 | 8/2006 | Olivier |
| 7,190,634 B2 | 3/2007 | Lambert et al. |
| 7,206,254 B2 | 4/2007 | Oliver et al. |
| 7,206,256 B1 | 4/2007 | Thornton et al. |
| 7,209,408 B1 | 4/2007 | Stottlemyer et al. |
| 7,221,623 B2 | 5/2007 | Thornton et al. |
| 7,222,579 B2 | 5/2007 | Hillesund et al. |
| 7,252,046 B1 | 8/2007 | Ead et al. |
| 7,293,520 B2 | 11/2007 | Hillesund et al. |
| 7,376,515 B2 | 5/2008 | Smith |
| 7,423,929 B1 | 9/2008 | Olivier |
| 7,451,549 B1 | 11/2008 | Sodhi et al. |
| 7,457,193 B2 | 11/2008 | Pramik |
| 7,623,411 B2 | 11/2009 | Faucheaux et al. |
| 7,660,189 B2 | 2/2010 | Vigen et al. |
| 8,347,801 B2 | 1/2013 | Denise |
| 2005/0180263 A1 | 8/2005 | Lambert et al. |
| 2006/0239122 A1 | 10/2006 | Vigen et al. |
| 2006/0256653 A1 | 11/2006 | Toennessen et al. |
| 2006/0262647 A1 | 11/2006 | Thornton et al. |
| 2007/0070808 A1 | 3/2007 | Ray et al. |
| 2008/0141916 A1 | 6/2008 | Bein |
| 2008/0163504 A1 | 7/2008 | Smith et al. |
| 2008/0223583 A1 | 9/2008 | Roveri et al. |
| 2009/0141587 A1* | 6/2009 | Welker et al. ................ 367/16 |
| 2009/0141591 A1* | 6/2009 | Basilico ....................... 367/128 |
| 2009/0161485 A1 | 6/2009 | Toennessen et al. |
| 2009/0262601 A1* | 10/2009 | Hillesund et al. ............. 367/16 |
| 2009/0265111 A1* | 10/2009 | Helwig et al. ................ 702/7 |
| 2009/0273340 A1* | 11/2009 | Stephanson ............ G01R 33/10 324/202 |
| 2009/0296519 A1* | 12/2009 | Keers et al. ................... 367/19 |
| 2009/0316526 A1* | 12/2009 | Grall ........................... 367/20 |
| 2010/0226204 A1 | 9/2010 | Gagliardi et al. |
| 2010/0312519 A1 | 12/2010 | Huang et al. |
| 2011/0013481 A1* | 1/2011 | Clark ........................... 367/15 |

FOREIGN PATENT DOCUMENTS

| | | |
|---|---|---|
| GB | 1376513 | 12/1974 |
| GB | 1415706 | 11/1975 |
| RU | 1744660 | 6/1992 |

(56) References Cited

FOREIGN PATENT DOCUMENTS

| RU | 1835938 | 4/1995 |
|---|---|---|
| RU | 1835938 A1 | 4/1995 |
| RU | 13929 U1 | 6/2000 |
| RU | 2317572 C1 | 2/2008 |
| SU | 1382736 A | 3/1988 |
| WO | 2008/060719 | 5/2008 |
| WO | 2008140654 | 11/2008 |
| WO | 2009/045639 | 4/2009 |

OTHER PUBLICATIONS

PESA News, "Extending the Range and Geographical Applicability of the Q-Marine Solution," by Tim Bunting, Western Geo, dated Apr./May 2009, 2 pages.

MacArtney A/S—Worldwide Underwater Technology, "ROTV Remote Towed Vehicles," obtained from http://www.macartney.com, generated on Nov. 12, 2009.

"Impacts of Marine Acoustic Technology on the Antarctic Environment," version 1.2, dated Jul. 2002, SCAR Ad Hoc Group on Marine Acoustic Technology and the Environment, 62 pgs.

ION Marine Imaging Systems—Optimizing 4D Repeatability with Enhanced Acquisition Technologies, by Mike Burnham, 4pgs., (c) 2007.

Jokat, W. et al. "Marine Seismic Profiling in Ice Covered Regions," Polarforschung 64 (1): 9-17, 1994.

Terra Antarctica, "A Novel Over-Sea-Ice Seismic Reflection Survey in McMurdo Sound, Antarctica," by S. J. Betterly, Montana Tech of the University of Montana, dated Sep. 18, 2007.

ION Marine Imaging Systems, "Model 5011 Compass Bird, Performance Data," (c) 2007.

ION Marine Imaging Systems, "Model 5010 DigiBIRD, Performance Data," (c) 2007.

ION Marine Imaging Systems, DigiFIN, Performance Data (c) 2008.

"HNB Ice Period Buoy Manufacturer Exporting Direct from Hebei China," obtained from http://buoy.en.alibaba.com, generated on Sep. 25, 2009.

Ice Spar Buoy, Rotonics Mfg. Inc., http://www.rotonics.com, 2807 Stephen F. Austin Drive, Brownwood, TX 76801, dated Jun. 3, 2003.

Intelligent Acquisition—"Streamer Steering Case Study," obtained from http://www.iongeo.com, generated on Nov. 10, 2009.

Fugro News, "Fugro Announces Purchase of FOCUS-2 ROTV Systems," dated Nov. 16, 2005, obtained from http://www.fugro.com, generated on Nov. 21, 2009.

"ORCA—Instrument Room Control System," obtained from http://www.iongeo.com, generated on Nov. 10, 2009.

ION Geophysical, "DigiFIN:Streamer Steering ," obtained from http://www.iongeo.com, generated on Nov. 10, 2009.

"Slocum Glider: Design and 1991 Field Trials," prepared by Paul Simonet, Webb Research Corp., under subcontract from Woods Hole Oceanographic Instituition, Office of Naval Technology, Contract No. N00014-90C-0098, dated Sep. 1992.

"Triaxus Towed Undulator," MacArtney Underwater Technology Group, dated Oct. 1, 2005.

International Search Report and Written Opinion in PCT/US2010/026617, dated May 4, 2010.

Microstrain, Inc. "Microminiature Sensors 3DM-GX1 Hard Iron Calibration," Published Sep. 19, 2005, obtained from www.microstrain.com, 13 pages.

"A Non-Linear, Two-Step Estimation Algorithm for Calibrating Solid-State Strapdown Magnetometers," by Gebre-Egziabher, D. et al. Department of Aeronautics and Astronautics, Stanford University, 10 pages, undated.

"A simple method of magnetic declination fluctuation correction for long single-streamer positioning in a seismic survey," by Victor Martin, et al., Geophysical Prospecting, 2004, 52, 351-358; Received Apr. 2003, revision accepted Oct. 2003; (c) 2004 European Association of Geoscientists & Engineers, 8 pages.

"Calibration of Strapdown Magnetometers in Magnetic Field Domain," Demoz Gebre-Egziabher, et al., Journal of Aerospace Engineering (c) ASCE Apr. 2006; obtained from www.ascelibrary.org, downloaded Jun. 1, 2011, 16 pages.

"In-fligh Heading Estimation of Strapdown Magnetometers using Particle Filters," Wonmo Koo, et al. obtained from IEEE (c) 2008, 6 pages.

"Chapter III: Theory of Magnetic Compass Adjustment," 7 pages, undated.

Honeywell, "3-Axis Digital Compass IC HMC5843," obtained from www.honeywell.com/magneticsensors, Form #900367, Jun. 2010, 20 pages.

Honeywell, "Three-Axis Strapdown Magnetometer—HMR2300r," obtained from http://www.ssec.honeywell.com, 900232 Rev. B 1/99, 8 pages.

"Marine Magnetometer: Woods Hold Oceanographic Institution," obtained from http://www.whoi.edu/page.do?pid=8415&tid=282&cid=14847&print=this, generated on Mar. 23, 2011, 3 pages.

"MEMSense: Technical Document, Compensating for Tilt, Hard Iron and Soft Iron Effects," Published Aug. 6, 2008, Updated Dec. 4, 2008, by Christopher Konvalin, Revision 1.2, obtained from www.memsense.com, Document No. MTD-0802, 15 pages.

"New Method for Magnetometers Based Orientation Estimation," Valerie Renaudin, et al. Schulich School of Engineering Position Location and Navigation (PLAN) Group, University of Calgary; IEEE/ION PLANSs 2010, May 4-6, 2010, Palm Springs, CA, 9 pages.

"TWOSTEP: A Fast Robust Algorithm for Attitue-Independent Magnetometer-Bias Determination," by Roberto Alonso and Malcolm D. Shuster, The Journal of the Astronautical Sciences, vol. 50, No. 4, Oct.-Dec. 2002, pp. 433-451.

"A Geometric Approach to Strapdown Magnetometer Calibration in Sensor Frame," J.F. Vasconcelos, et al., 11 pages, undated.

"Towed body magnetometer enhances subsea surveys," by Natasja Verboom, et al. obtained from www.chelsea.co.uk, 2 pages, undated.

"The US/UK World Magnetic Model for 2010-2015," Maus, et al., NOAA Technical Report NESDIS/NGDC, 104 pages, undated.

"Processing of shipborne magnetometer data and revision of the timing and geometry of the Mesozoic break-up of Gondwana," Matthias Konig, Alfred Wegener Institute, Institute for Polar and Marine Research, 145 pages, undated.

Danish Examination Report from related DK Appl. No. PA 2010 70472, dated Sep. 22, 2011.

Official Action in counterpart Russian Appl. No. 2011140864, dated Apr. 29, 2012.

Translation of Official Action in counterpart Russian Appl. No. 2011140864.

Pending Claims in n counterpart Russian Appl. No. 2011140864.

Official Action in counterpart Danish Appl. No. PA201270271, dated Dec. 18, 2012.

International Search Report from counterpart PCT Appl. No. PCT/US2012/036739, dated May 3, 2013.

European Search Report from counterpart EP Appl. No. 12168832.9, dated May 3, 2013.

European Search Report from counterpart EP Appl. No. 12168832.9, Oct. 21, 2013.

Second Technical Examination: Intention to Grant in counterpart DK Appl. No. P81202238DK00, dated Oct. 21, 2013.

Konvalin, C., "Compensating for Tilt, Hard-Iron, and Soft-Iron Effects," XP002714616, Dec. 1, 2009.

Official Action in counterpart Danish Appl. No. PA201270271, dated Jan. 15, 2015.

Official Action in counterpart Russian Appl. No. 2013156811, dated Oct. 28, 2014.

\* cited by examiner

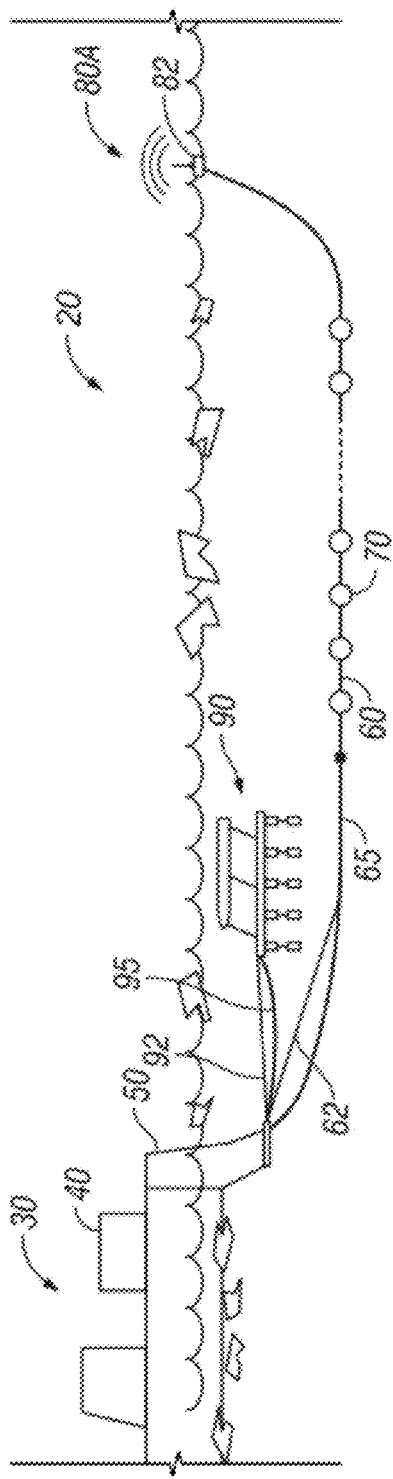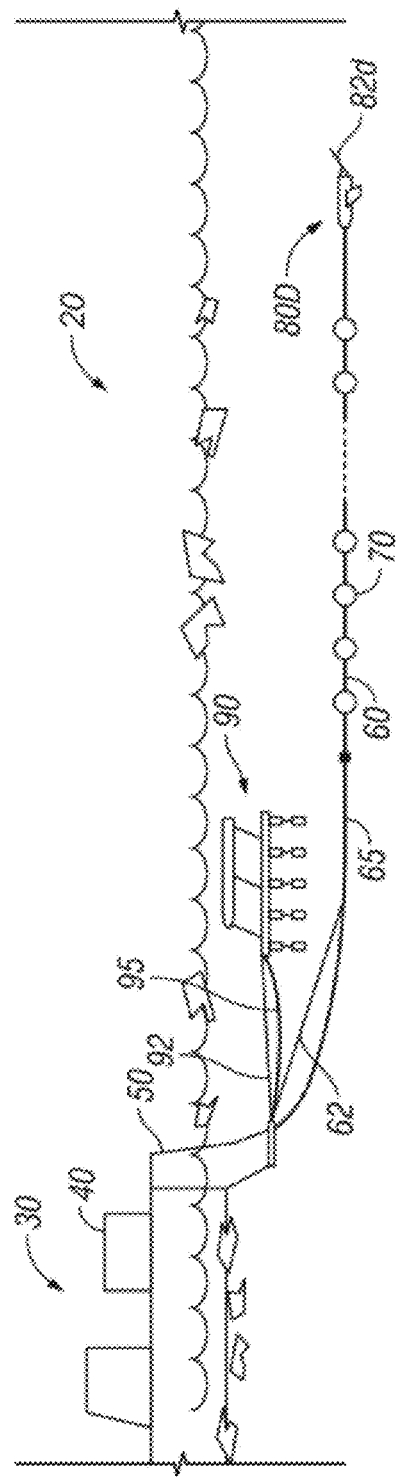

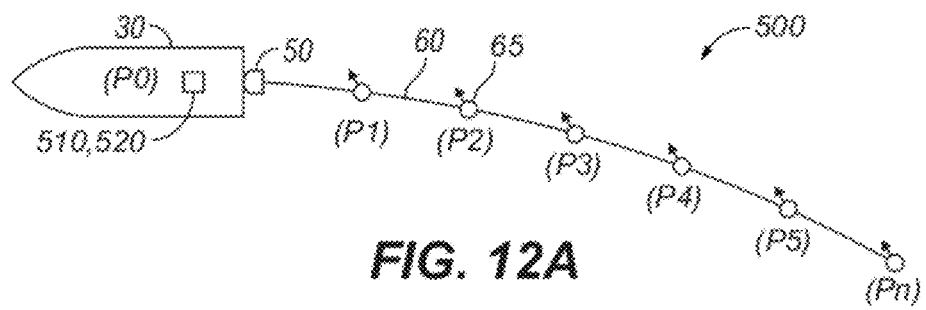
FIG. 12A
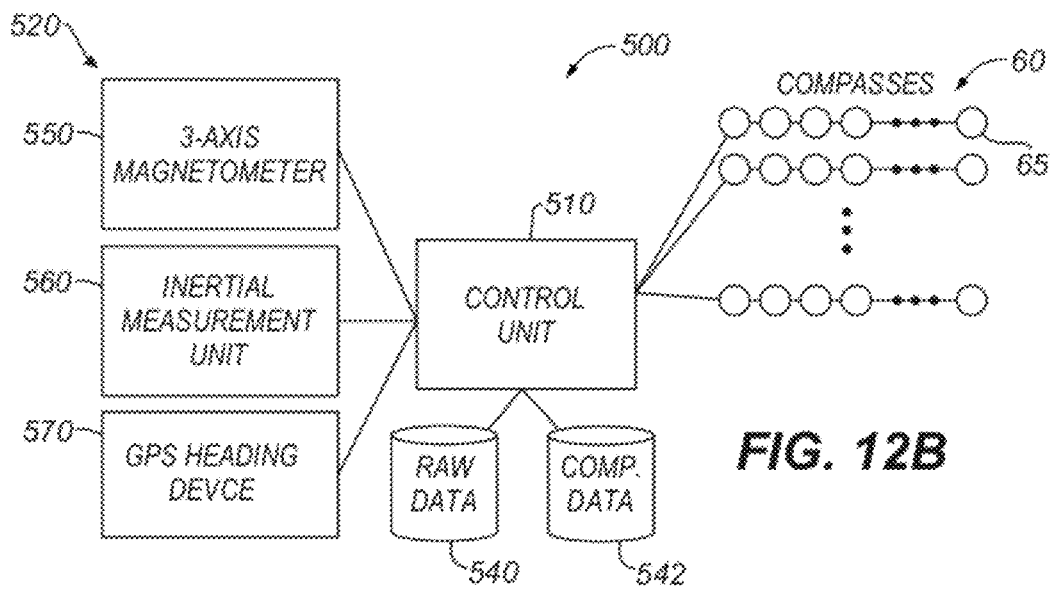
FIG. 12B
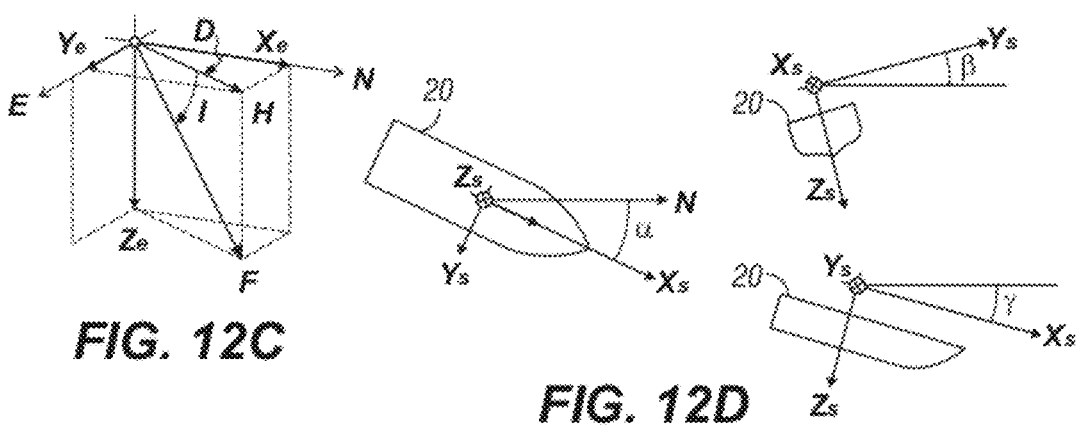
FIG. 12C
FIG. 12D

DECLINATION COMPENSATION FOR SEISMIC SURVEY

CROSS-REFERENCE TO RELATED APPLICATIONS

This is a continuation-in-part of U.S. patent application Ser. No. 12/719,783, filed 8 Mar. 2010, which is incorporated herein by reference, to which priority is claimed, and which claims priority to U.S. Prov. Appl. Nos. 61/158,698, filed 9 Mar. 2009; 61/246,367, filed 28 Sep. 2009; and 61/261,329, filed 14 Nov. 2009.

BACKGROUND

Conventional marine seismic surveying uses a seismic source and a number of streamers towed behind a seismic survey vessel. These streamers have sensors that detect seismic energy for imaging formations under the seafloor. Deploying the streamers and sources and towing them during the survey can be relatively straightforward when operating in open waters with moderate swells or the like.

However, marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can also complicate the seismic record produced.

Additionally, the ice floes on the water's surface make towing the source and streamers more difficult and prone to damage. Any components of the system at the water's surface can encounter ice, become bogged down, and lost. In addition, any cables or towlines coming off the vessel even from slipways can collect ice at the surface, potentially damaging the cables or towline. Likewise, ice pulled under the hull and rising behind the vessel can shear away these cables and lines. Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed.

In addition to some of the physical challenges involved in surveying in arctic or icy regions, for example, variations in the earth's magnetic field in any give region of the earth can cause problems in land-based and marine-based seismic surveying. As is known, the earth's magnetic field can be described by seven parameters, including declination (D), inclination (I), horizontal intensity (H), the north (X) and east (Y) components of the horizontal intensity, vertical intensity (Z), and total intensity (F) measured in nanoTeslas. Most of the geomagnetic field (i.e., the main field) comes from the earth's outer core. Various mathematical models, such as the International Geomagnetic Reference Field (IGRF) and World Magnetic Model (WMM), can describe this main field and how it changes slowly over time. Although the changes of the field may be somewhat predictable, the geomagnetic field also varies due to currents inside the magnetosphere and the ionosphere and due to other variations that are less predictable.

The variations and changes in the geomagnetic field can affect seismic surveying in arctic regions as well as other locations. For example, compass readings from seismic survey equipment can be affected by differences in declination at arctic latitudes. As is known, magnetic declination represents an angle between magnetic north and true geographic north. The variation in declination depends on latitude and longitude and changes over time, and the variability in azimuth increases at arctic latitudes.

As will be appreciated, a compass reading can be corrected based on the magnetic declination (the angle between true north and the horizontal trace of the magnetic field) for the compass' location. To correct the compass' bearing, a true bearing is computed by adding the magnetic declination to the compass' magnetic bearing. Unfortunately, areas around the north and south magnetic poles can produce erratic or unusable compass readings, and some zones on the earth can have wide discrepancies in declination.

The published magnetic models of the earth invariably have errors or are not entirely accurate to a level of detail sometimes needed. Conventional marine-based seismic surveying can avoid problems by using a closed traverse in which GPS readings are consistently obtained by tail buoys on the streamers. In arctic exploration, however, the system cannot typically use a tail buoy due to ice floes so that the system cannot obtain GPS readings on a reliable basis. This makes tracking and locating seismic survey equipment and data more problematic for icy or obstructed waters.

The subject matter of the present disclosure is directed to overcoming, or at least reducing the effects of, one or more of the problems set forth above.

SUMMARY

A seismic survey system operates in regions or at times in which variations in declination can create errors in geomagnetic field measurements taken during the survey. For example, arctic regions of the earth can have variations in declination that change in a seismic survey area, and errors in compass readings can be problematic in marine seismic surveys in such regions. The problems can be further exacerbated when the region has icy waters that limit the use of tail buoys to obtain GPS readings.

In a marine-based system, for example, a vessel tows streamers during the survey. Compasses gather information for calculating the locations of the streamers during the marine seismic survey. As is known, the compasses give a magnetic azimuth, and their location has to be calculated in a geographical reference system. Because the compasses are sensitive to the declination of the local magnetic field, any local discrepancies can reduce the accuracy of reconstructing the streamer's locations from the compass readings. For this reason, the survey system measures the magnetic declination in real-time as the survey proceeds and corrects the geomagnetic field measurements (e.g., compass readings) in real time or later in processing.

Correcting for declination can be useful in any form of marine seismic surveying and even in land-based seismic surveys. When performing marine surveys in arctic regions in particular, correcting for magnetic declination can be particularly useful because the system cannot always use GPS readings from a tail buoy or the like on the streamers to determine the locations of the sensors. Instead, the streamers have a number of cable compasses or other magnetic heading devices used for monitoring the location of the streamers during the survey. Without consistent GPS readings from a tail buoy, the survey system has to determine deformation of the current magnetic declination caused by variations in the earth's crust, atmosphere, and the like so the compass readings can be corrected.

As noted above, the survey system in arctic regions cannot typically use tail buoys to obtain absolute positions (e.g., GPS readings) for the seismic streamers due to ice floes or other obstructions. Thus, the survey must use an open traverse. For this reason, the system needs to handle errors rigorously in the various compass readings along the streamers. As one solution, controllable vehicles on the streamers can be intermittently brought to the surface when clear of ice floes or other obstructions so that absolute positions (e.g., GPS readings) can be obtained and communicated to the survey system. Such a controllable vehicle can be located at the tail end of the streamers or elsewhere.

After obtaining the intermittent GPS readings, the controllable vehicles can then float back under the surface to avoid encountering ice and to keep the streamer protected under the water's surface. All the while, an Inertial Navigation System (INS) device, integrated navigation system, or other like system can supplement the intermittent GPS readings with relative position information so the location of the streamers can be determined even when significant ice floes at the surface prevent the controllable vehicles from obtaining new GPS readings. This relative position information includes inertial measurements of the streamer while towed under the surface of the water.

At the same time, the survey system can obtain declination measurements and correct the various cable compass or other sensor readings on the streamers accordingly. To do this, a declinometer having a magnetometer can be deployed behind the vessel for obtaining the declination measurements. For example, the declinometer can be towed on the end of a streamer cable or towed off the stern of the vessel. Typically, such a declinometer is towed two or more lengths of the vessel behind the tow vessel.

For some declinometers, issues with motion encountered by the declinometer when towed may over-complicate handling of the measurements the declinometer obtains. For example, the magnetometer reading may need to be corrected on a continual basis relative to the magnetometers spatial orientation while being towed. This can increase computational complexities. To avoid such complications, the components for the declinometer can be used directly on the tow vessel even though the vessel produces some magnetic influence on the declination readings. Use on the vessel is possible when various calibration steps are performed to compensate for soft and hard iron effects caused by the vessel on the declinometer.

The declinometer for use on the vessel obtains three-axis geomagnetic field readings using a magnetometer, such as an aeronautical 24-bit Honeywell strapdown magnetometer. The declinometer also uses a three-compass inertial measurement unit (IMU) device along with computing and motion compensation calculations associated with such a device. In the end, the system combines GPS readings and inertial measurements (i.e., absolute position and inertial position) from the IMU device together and then compares the measurements to the three-axis geomagnetic field reading from the magnetometer to calculate declination corrections. In turn, the various cable compass or other sensor readings along the streamers can be corrected with this calculated declination.

Correcting for declination determined at a tow vessel can apply to marine seismic surveys in icy or obstructed waters as well as other applications. In general, the techniques disclosed herein can be used in marine surveys where no tail buoy can be used to obtain GPS readings or such readings can only be sporadically obtained. For example, any form of marine seismic survey that uses streamers towed at a deep depth under the surface or at a slant from the tow vessel so that obtaining GPS readings for the streamers cannot be done may benefit from these techniques.

As noted above, using declination measurements from the tow vessel to correct cable compass readings on the streamers requires calibration steps to be preformed to account for the vessel's influence on the declinometer. Briefly, the tow vessel traverses a circular pattern during calibration and obtains readings from the declinometer and IMU device. Readings from the IMU device are then used to correct for pitch and roll of the tow vessel. The survey system then corrects for hard iron effects from the tow vessel and for soft iron effects from ambient differences in the earth's geomagnetic field on the vessel. Software algorithms perform these corrections and determine compensation factors or parameters. A deviation curve can also be used to monitor magnetic field, and magnetic observatory data in the region of interest may be used to enhance the calibration of the declinometer.

Once obtained, the declination corrections can be applied to readings from any of the various devices used during a seismic survey, such as cable compasses, streamers, etc. The various readings can be adjusted in real-time, and raw data for both declination correction and compass readings can be stored for later use and processing. Moreover, the compass readings and the like can be corrected in real time so that the survey system can better monitor and control the streamers during the survey.

It is believed that corrections at latitudes in arctic regions may be as much as 1 to 2 degrees of difference. When multiple streamers are involved and have considerable length, variations along the length of the streamers can be compounded during a survey. Therefore, being able to correct the error in declination can be useful in monitoring and recording the locations of the streamers for seismic exploration. In the end, the correction may achieve accuracy as close as 0.1%.

Other than marine applications, declination variations can be problematic in land-based applications where magnetic heading is used. Declination varies spatially and temporally, and the variances may be exacerbated at arctic latitudes, during solar storms, etc. Therefore, even land-based surveys can benefit from the disclosed techniques.

The foregoing summary is not intended to summarize each potential embodiment or every aspect of the present disclosure.

BRIEF DESCRIPTION OF THE DRAWINGS

FIGS. 2C-2D illustrate side views of marine seismic survey systems having a flotation device and different types of controllable devices.

FIGS. 12A-12B schematically illustrates elements of a control system on a towing vessel having declinometer components.

FIG. 12C schematically shows a geomagnetic coordinate system.

FIG. 12D schematically shows a vessel's coordinate system with attitude angles measured relative to geographical north and a horizontal plane.

DETAILED DESCRIPTION

A. Declination Correction for Seismic Surveys

Seismic surveys on land or sea use sensors to obtain seismic signals. An image of a subterranean formation of interest can then be generated when the locations of these sensors are known when the seismic signals are obtained. In many cases, geomagnetic field measurements, such as compass readings, are used to determine the location, orientation, and heading of the seismic sensors. Although declination varies over time and at different locations on the earth, the variance can be more pronounced at certain locations (e.g., arctic latitudes) or during certain events, (e.g., solar storms). Therefore, being able to correct for declination in real-time for a given spatial location on the earth can be beneficial in seismic surveys and can improve the accuracy of the survey results.

Figure 1:
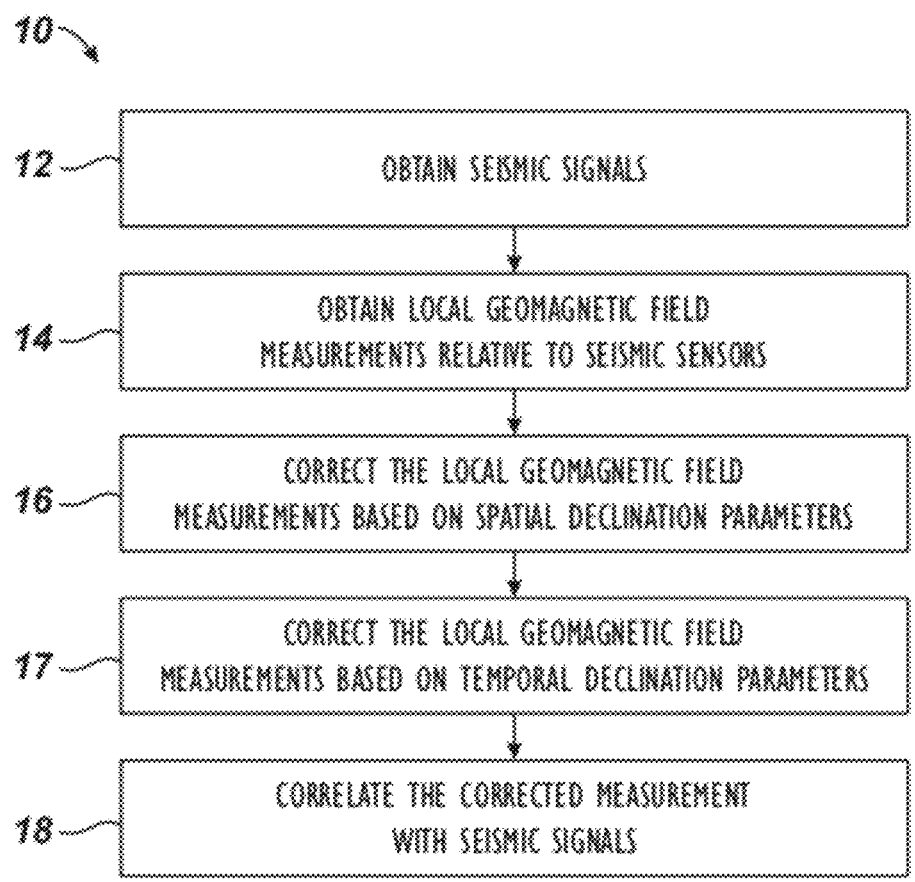
FIG. 1 shows a process of correcting seismic survey signals for declination.

To that end, a system and method are disclosed for correcting declination both temporally and spatially during seismic surveys, which can be either land-based or marine-based. In FIG. 1, a process 10 for correcting declination for a seismic survey is shown in flow chart form. During the survey, seismic signals are obtained with one or more seismic sensors in a survey area (Block 12). For a marine-based survey, the sensors can be hydrophones disposed along streamers towed behind a vessel, and the seismic signals can be generated by a source, such as air guns also towed behind the vessel. For a land-based survey, the sensors can be geophones disposed at various locations on the ground, and the seismic signals can be generated by a vibrator or other seismic source.

To image the formation of interest with the seismic signals, the locations of the sensors relative to the source must be know. For this, local geomagnetic field measurements are obtained relative to the seismic sensors (Block 14). For example, compass readings may be made on the towed streamers during a marine seismic survey. Readings may also be made on the tow vessel or elsewhere. For land-based seismic, compass readings may also be obtained to orient the sensors and sources.

As is known, compasses and other similar sensors give a magnetic azimuth, but the positions of various sensors, sources, etc. for imaging the earth are calculated in a geographical reference system, such as latitude and longitude. Therefore, the compass readings need to be translated to the reference system. Unfortunately, the compasses or similar sensors are sensitive to the declination of the local magnetic field in the survey area so that any local discrepancy reduces the accuracy of reconstructed locations of the compasses. To overcome this, the local geomagnetic field measurements are corrected to account for the declination in the survey area.

Declination varies over time and across different locations of the earth. As noted previously, this can be especially true in certain areas of the earth or under certain conditions. Thus, the local geomagnetic field measurements (i.e., compass readings) are corrected based on temporal and spatial declination parameters, which have been determined according to the techniques discussed herein (Block 16-17). Ultimately, these corrected measurements can be correlated with the seismic signals obtained so a more accurate seismic image can be produced (Block 18).

To correct for declination in a marine seismic survey, for example, the various compass readings obtained from the streamer for locating the sensors can be corrected over time and relative to the current declination measurement of the area of interest. As discussed below, this can involve calibrating a declinometer deployed on the tow vessel to remove hard and soft iron effects so the current declinations can be calculated and used to correct the compass readings along the streamers. Declination calculations from local base stations may also be used to interpolate the current declinations of the survey area.

To correct for declination in a land-based seismic survey, for example, the various readings obtained for locating the geophones can be corrected over time and relative to the current declination measurements of the area of interest. As discussed below, this can involve using declinometer measurements at the local sensors and interpolating declination from local base stations near the survey area.

B. Marine Seismic Survey System

With an understanding of the overall process of correcting declination in a seismic survey, discussion now turns to details of a marine seismic survey system and the declination corrections that can be performed with it.

Figure 2A:
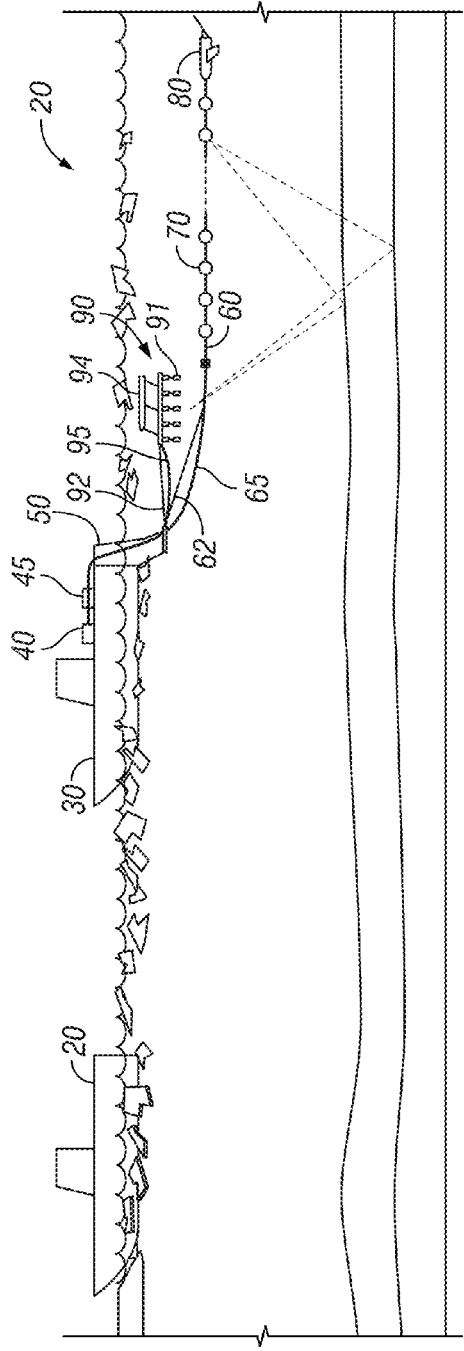
FIGS. 2A-2B show side and plan views of a marine seismic survey system according to certain teachings of the present disclosure for use in icy regions.
Figure 2B:
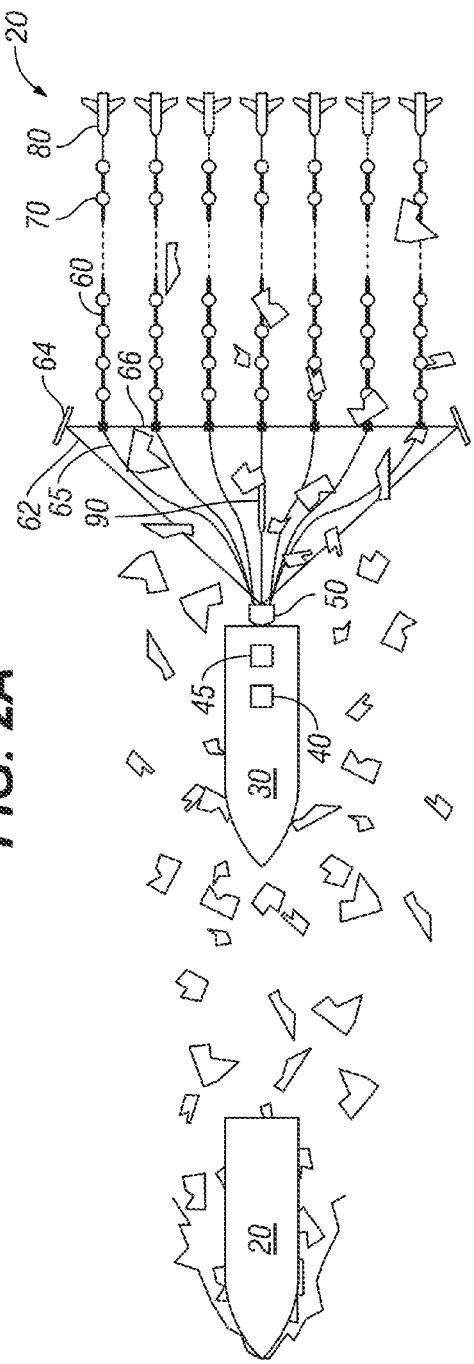

FIGS. 2A-2B show a marine seismic survey system 20 having a tow vessel 30 towing a number of streamers 60 with sensors 70. This system 20 can be similar to a conventional marine seismic survey system used in typical waters. However, as particularly shown, the system 20 can be used in icy regions having glacial ice, pack ice, ice floes, or other obstructions or obstacles at the water's surface that can interfere with towed components of the marine seismic survey system. In this particular system 20, an ice breaker vessel 35 breaks ice in advance of the tow vessel 30. Either way, various forms of marine seismic systems that gather information of streamer locations during the survey using geomagnetic field measurements, such as compass and magnetometer readings, can benefit from the declination correction as discussed herein.

As the tow vessel 30 tows streamers 60, a supply system 45 operates a source 90, and a control system 40 having a seismic recorder records the seismic data obtained with sensors 70 on the streamers 60. Extending below the vessel's waterline, an ice skeg 50 keeps the attachment points for towlines 62/92 below the surface of the water. Streamer cables 65 connected to the seismic recorder of the control system 40 extend form the vessel 30, and the skeg 50 directs these streamer cables 65 below the water's surface so that ice will not interfere with or collect around them.

The seismic source 90 has a plurality of seismic source elements 91, which are typically air guns. A supply cable 95 connected to the supply system 45 extends from the vessel 30. A towline 92 connects the cable 95 to the ice skeg 50 and helps tow the source 90 behind the vessel 30.

As further shown in FIG. 2B, paravanes, fins, or doors 64 and a spreader 66 can be used to support multiple streamers 60 behind the tow vessel 30. These paravanes 64 and spreader 66 can also be similar to conventional components used for marine seismic surveying, except that the paravanes 64 preferably tow under the water's surface.

During marine seismic surveying, it is desirable to determine, track, and potentially control the positions of the streamers 60 to better acquire and map the seismic data obtained. Determining absolute position can be done using GPS readings of the streamers 60 during the survey.

In the marine seismic survey systems 20 of the present disclosure, however, obtaining GPS readings can prove difficult because the system 20 is significantly submerged below the water's surface so that GPS receivers cannot operate to obtain readings. For this reason, the system 20 has deployed devices 80 on the streamers 60 to assist in determining the absolute position of the streamers 60 as well as to actively control their positions. Moreover, various sensor readings of geomagnetic field measurements, such as compass readings along the streamers 60, can suffer from fluctuations in declination over time and over the survey area. For this reason, the system 20 uses declination correction techniques as discussed later.

Discussion now turns to several types of deployed or controllable devices 80 that can be used on the streamers 60 to obtain GPS readings and otherwise control the position of the streamers 60 during surveying.

1. Floating Deployed Device

In FIG. 2C, the marine seismic survey system 20 is shown having a first type of deployed device 80A according to the present disclosure. During a marine seismic survey, the locations of the streamers 60 are controlled and monitored so that the absolute positions of the array of sensors 70 can be known for proper data acquisition and analysis. For example, GPS coordinates of the streamers' tail ends can be used to coordinate the position of each of the sensors 70 on the various streamers 60, and a control system 40 uses these coordinated positions for data acquisition, analysis, and control. A suitable system for acquisition, analysis, and control includes ION Geophysical's Intelligent Acquisition system that can determine the locations of the streamers 60. Such a system can steer the streamers 60 using DIGIFIN™ streamer steering systems and ORCA® command control software, which are available from ION Geophysical. (DIGIFIN is a registered trademark of ION Geophysical, Corporation, and ORCA is a registered trademark of Concept Systems Holdings Limited.)

In the present survey system 20, the streamers 60 travel submerged below the water's surface using the skeg 50 and other features disclosed herein. Yet, it is still necessary to determine the locations of the streamers 60. To obtain the location of a given streamer 60, the system 20 in FIG. 2A uses the deployed device 80A that floats on the water's surface at the tail end of the streamer 60.

The deployed device 80A can be a spar type buoy designed to handle ice impacts and shed ice floes while at the surface. The device 80A includes a GPS receiver 82 that can obtain GPS coordinates for the deployed device 80A as it is towed behind the vessel 30 with the streamer 60. Obtaining the GPS coordinates can use conventional techniques known in the art so that they are not detailed herein. For example, details related to GPS-based positioning of an underwater streamer cable 60 can be found in U.S. Pat. No. 7,190,634, which is incorporated herein by reference.

As the vessel 30 tows the streamer 60, the source 90 produces source signals, and the sensors 70 detect seismic signals. The control system 40 obtains GPS coordinates from the deployed device 80A using the streamer 60 and other lines for communication and power to the GPS receiver 82. Then, using techniques known in the art, the control system 40 determines the location of streamer 60, sensors 70, source 90, and other components relative to the vessel 30 and physical coordinates of the area being surveyed.

Although the marine seismic survey system 20 uses the floating deployed device 80A of FIG. 2C, this is generally possible as long as the surfaced device 80A is designed to encounter a certain amount of ice floes, obstacle, or the like. Otherwise, the surfaced device 80A can become bogged with ice, damaged by impacts, moved out of place, or lost. Therefore, in some situations, a submersible form of deployed device 80 may be used as described below.

2. Controllable Deployed Devices

The previous deployed device 80A was intended to float at the surface. Other devices disclosed in incorporated application Ser. No. 12/719,783 can also be used and can have buoys, drogues, tethers, etc.—Notably, the marine seismic survey system 20 in FIG. 2D has a deployed device 80D whose depth can be controlled. During surveying, the controllable deployed device 80D is towed on the end of the streamer 60 below the surface of the water to avoid impacts with ice floes. To obtain GPS readings, the deployed device 80D has a GPS receiver 82d that can be brought to the surface by controlling the depth of the device 80D. Therefore, the deployed device 80D is preferably towed below the surface in line with the streamer 60 and is brought to the surface to obtain GPS readings with the receiver 82d at appropriate times.

Figure 3A:
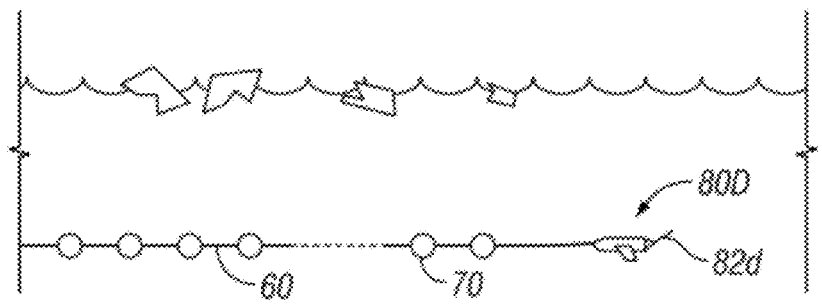
FIGS. 3A-3B illustrate one type of controllable device in two operating conditions.
Figure 3B:
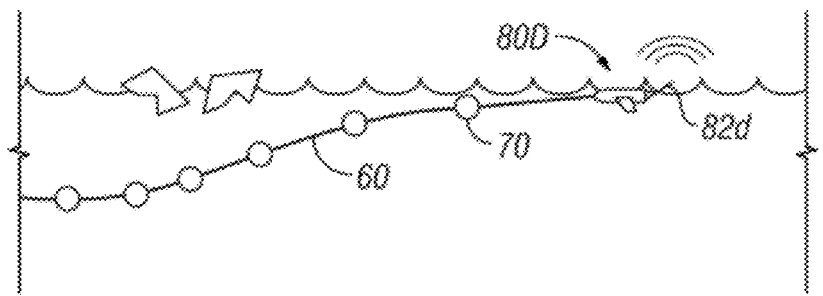

FIGS. 3A-3B illustrate the previously described deployed device 80D in two operating conditions. In its standard gliding condition of FIG. 3A, the deployed device 80D follows behind the streamer 60 underwater. This position is suitable when ice floes, obstructions, or the like are at the surface of the water that can damage or obstruct the deployed device 80D. When a clearing develops at the surface, the deployed device 80D can be raised to the surface so that the GPS receiver 82d can obtain GPS readings. To map the array of streamers 60 and sensors 70 adequately, these GPS readings may need to be made at periodic intervals so the location of the streamers 60 and sensor 70 can be sufficiently tracked.

The deployed device 80D can be a controllable vehicle, device, or glider. In one arrangement, for example, the deployed device 80D can be a Remotely Operated Vehicle (ROV) having a propulsion system and controllable fins or the like to steer the deployed device 80D to desired positions in the water as it is towed. Alternatively, the deployed device 80D can be a towed glider that moves up or down using buoyancy control, as described in more detail latter. In yet another alternative, the deployed device 80D can be a Remotely Operated Towed Vehicle (ROTV) lacking a propulsion system but having controllable fins, as also described in more detail latter.

Figure 4:
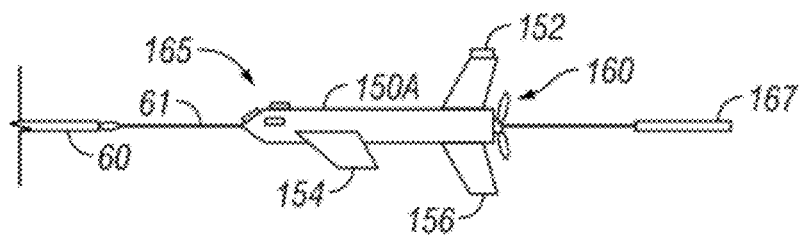
FIG. 4 illustrates an embodiment of a controllable device according to the present disclosure.
Figure 5:
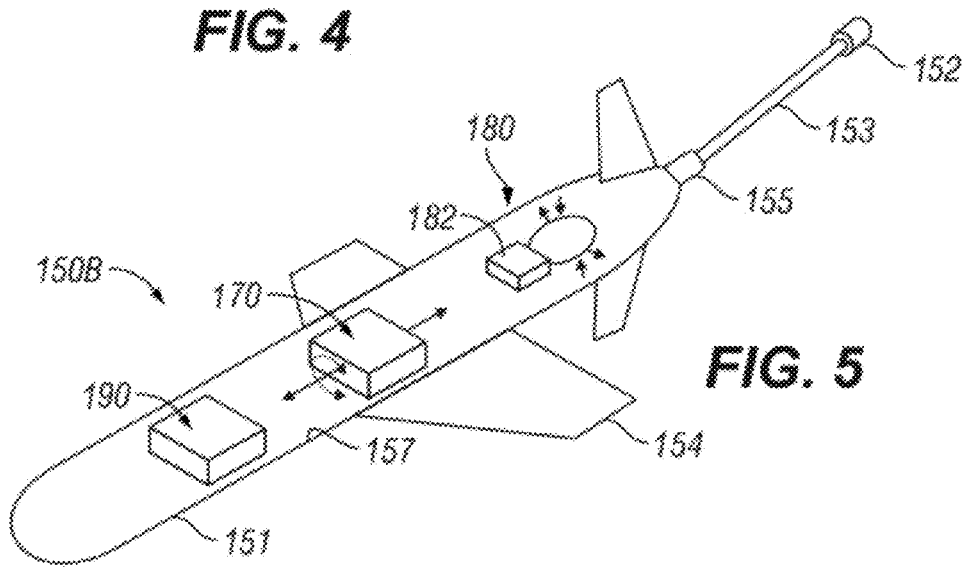
FIG. 5 illustrate inner details and components of a controllable device.

Along these lines, FIGS. 4-5 illustrate embodiments of deployed device or controllable vehicles 150A-B for the disclosed marine seismic system 20. As shown in FIG. 4A and as noted previously, the vehicle 150A attaches to the end of the seismic streamer 60, which provides power and communications for the vehicle 150A. A tether 61 can be used for this purpose. Fins 154/156 on the vehicle 150A may be movable, and the vehicle 150A can have a propulsion system 160, such as a propeller. Alternatively, the fins 154/156 do not need to be movable. Instead, the vehicle 150A uses buoyancy control, as described below. Likewise, the vehicle 150A does not use propulsion, and the system 160 on the vehicle 150A may actually be a brake, as also described later.

As shown, the vehicle 150A has a detector 165 for detecting surface obstructions. This detector 165 can include sonar, ice profiler, optical sensor, multi-beam fathometer, camera, or the like that is upward looking and monitors for obstructions (or clearings) above the vehicle 150A. Signals from the detector 165 can be integrated with a navigation and/or control system (not shown) for acquiring marine seismic data, such as the Orca® system. In this way, the control system can determine when the surface above the vehicle 150A is free of ice and can signal the vehicle 150A to rise to the water's surface.

As one example, the detector 165 can use sonar to detect when ice is present at the surface. For example, if ice of a particular thicknesses is present at the surface, the sonar detector 165 may detect this surface ice, and this information can then be used for determining whether the vehicle 150A is raised or not. Although this depends on its capabilities, the sonar detector 165 is preferably able to detect thinner ice that is at least less than 1-m thick so the vehicle 150A can be protected from most surface ice that may be present.

As another example, the detector 165 can be an optical sensor that determines available light at the surface, which may indicate the presence or absence of ice. Along these lines, the detector 165 can be a digital camera that feeds video or images along the streamer 60 to the towing vessel. The tail ends of the streamers 60 can lie a significant distance from the tow vessel, and operators will not be able to determine where the streamers 60 are and what ice may be over the vehicles 150A. Therefore, operators can view the video or images from the camera 165 and determine whether to raise a particular vehicle 150A or not if a clearing is present. This can then be done remotely by activating the vehicles 150A with signals communicated from the vessel to the vehicles 150A via the streamers 60.

The vehicle 150A also has a GPS receiver 152. As shown, this GPS receiver 152 can be located on an upward fin 154 so that the antenna 152 can peek above the surface of the water when the vehicle 150A glides to the surface for acquiring GPS readings. Regardless of how the GPS receiver 152 is surfaced, the GPS readings obtained are communicated to the instrument control system for positioning the streamer 60 and determining its location for proper data acquisition and analysis.

Because continuous GPS readings may not always be available, the vehicle 150A may include an inertial navigation system to maintain the bearing intermittently determined by GPS readings as noted herein. Moreover, the vehicle 150 may include a declinometer 167, which can be tethered from the end of the vehicle 150A to keep it away from any interfering electronics. The declinometer 167 can use a three-axis magnetometer to calculate declination in the earth's magnetic field, and the declination can then be corrected to a true north reading so the instrument control system can determine the absolute position of the end of the streamer 60 in the absence of more consistent GPS readings usually used for that purpose. Rather than towing the declinometer 167 at the end of the streamer 60, the declinometer 167 can preferably be towed on its own directly behind the vessel 30, typically at a distance of 2½ times the vessel's length, to reduce interference from the vessel's magnetic field. Even more preferably and as described later, a declinometer can be disposed on the vessel 30 itself.

The vehicle 150A intermittently gets GPS readings by going to the surface to obtain GPS data with the GPS receiver 152. Then, diving under the surface, the vehicle 150A can use the previously obtained GPS data along with inertial navigation data, compass readings, and current declinometer data to determine the real-time or near real-time location of the streamer 60 on an ongoing bases until new GPS readings can be obtained.

The deployed device or vehicle 150B in FIG. 5 reveals some inner details and components. On the vehicle 150B, the fins 154 are not movable, and the vehicle 150B does not use propulsion. Instead, the vehicle 150B uses buoyancy control having a volume (e.g., bladder) 180 in a free-flooded tail of the vehicle 150B. The volume of this bladder 180 can be adjusted using a pumping system 182 or the like so that the buoyancy of the vehicle 150B can be altered in a controlled manner.

To change the pitch and roll of the vehicle 150B, a mass 170 can be shifted axially along the length of the vehicle 150B or rotated about an axis. Preferably, the mass 170 is the actual battery used for the vehicle's electronic components, which include servos or other motors for moving the mass 170.

In contrast to the GPS receiver of FIG. 4, the GPS receiver 152 shown in FIG. 5 is located on the end of an extended arm or mast 153. This arm 153 can extend upward at an angle from the vehicle 150B so that the GPS receiver 152 can extend from out of the water when the vehicle 150B glides near the surface. Alternatively, the mast 153 can be pivoted at its base 155 from a streamlined position in line with the vehicle 150B to an upward angled position. When the vehicle 150B is periodically brought to the surface to obtain GPS data, the mast 153 can be activated to pivot the GPS receiver 152 out of the water at this base 155.

In general, the vehicle 150B can have features similar to those used for vehicles and drifting profilers that measure subsurface currents, temperatures, and the like in the oceans. As such, the vehicle 150B has a chassis (not shown) holding the variable buoyancy system 180, mass 170, and electronics section 190. An isopycnal hull 157 suitable for the density of seawater can fit in sections on the chassis. The hull 157 and chassis can then fit within a fiberglass housing 151 having the fins 154 and streamlined shape. The mast 153 for the GPS receiver 152 can connect to the electronics section 190 and can extend from the housing 151.

As disclosed in the incorporated application, these and other controllable deployed devices 80 can be used at the tail end of the streamer 60 (as well as other locations). When the tail end devices 80 are brought to the surface, they can obtain GPS readings for determining the location of the streamers.

3. System Using Controllable Deployed Devices

Figure 6A:
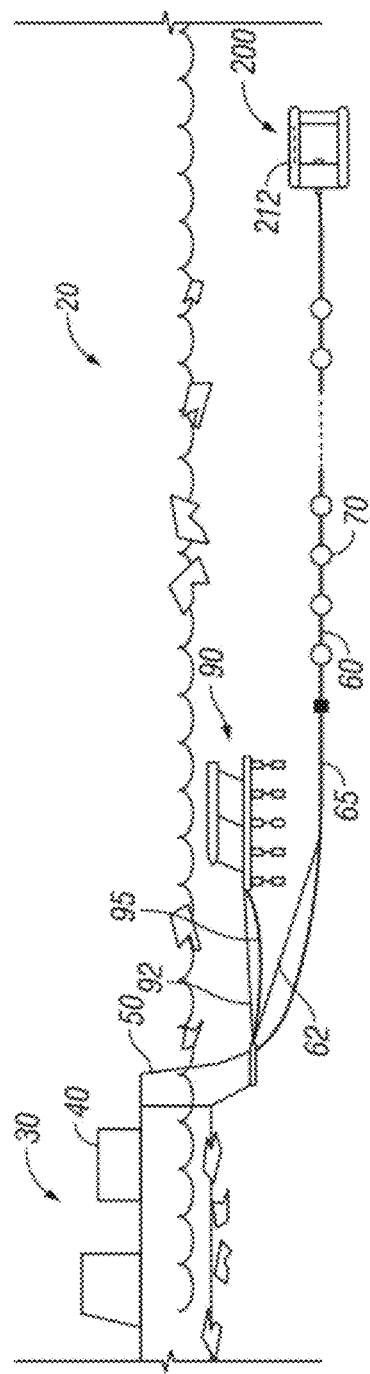
FIG. 6A illustrates a side view of a marine seismic survey system having a Remotely Operated Towed Vehicle (ROTV) as the controllable device at the tail end of the streamers.

As noted previously, the controllable deployed devices 80 can be used on the tail end of the steamers 60 to control position of the streamers 60. As also noted previously, the devices 80 can include Remotely Operated Towed Vehicles (ROTVs) that lack a propulsion system but have controllable fins. FIG. 6A illustrates a side view of a marine seismic survey system 20 having a Remotely Operated Towed Vehicle (ROTV) 200 as the controllable device at the tail end of the streamers 60. The ROTV 200 is towed on the end of the streamer 60 below the surface of the water. This ROTV 200 also has a GPS receiver 212 that can obtain GPS readings once the ROTV 200 is brought to the surface.

Figure 6B:
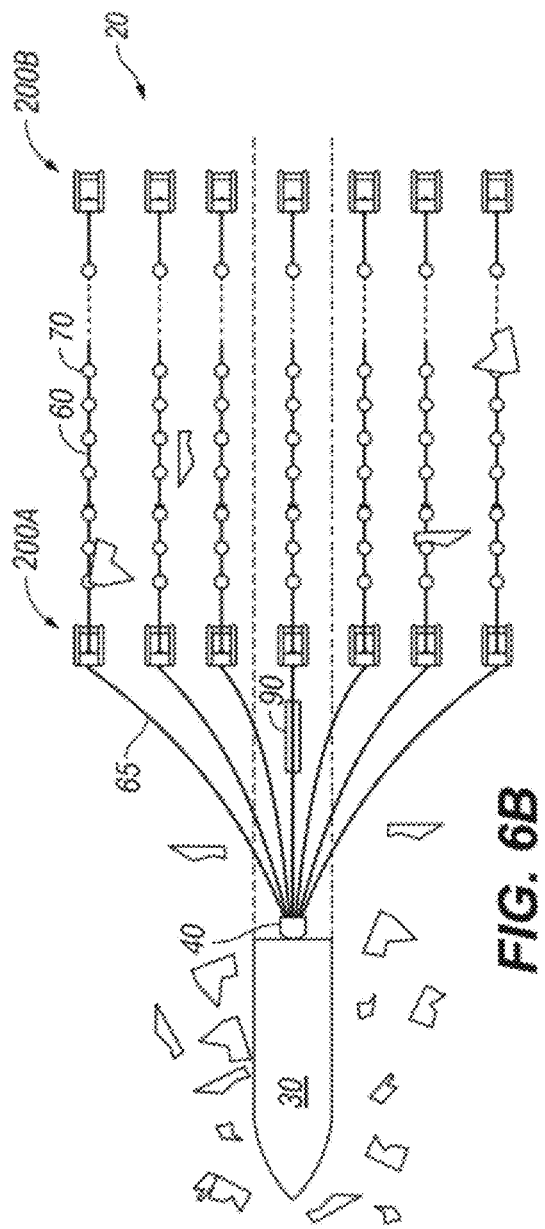
FIG. 6B illustrates a plan view of another marine seismic survey system having ROTVs at multiple locations on the streamers.

FIG. 6B illustrates a plan view of the marine seismic survey system 20 having ROTVs 200 at multiple locations on the streamers 60. In this system, leading ROTVs 200A are towed at the head of the streamers 60, and trailing ROTVs 200B are towed on the end of the streamers 60. The leading ROTVs 200A connect by towlines 62 and streamer cables 65 off the vessel's skeg 50. If desired, even intermediate ROTVs (not shown) may be deployed at intermediate locations along the streamers 60.

To achieve three-dimensional (or even 2-D or 4-D) operation, each of the leading ROTVs 200A individually tows a streamer 60. Towlines and streamer cables 62/65 connect the ROTVs 200A to the vessel's skeg 50. During surveying, the position and depth of each ROTV 200A-B can be controlled to maintain an appropriately arranged array of streamers 60 for the seismic survey. In addition, the controlled depth allows the streamers 60 to avoid any ice floes at the surface.

Using the ROTVs 200A-B in leading and tailing locations along the streamers 60 can facilitate deployment and retrieval of the streamers 60. Being independent of one another, for example, individual ROTVs 200A-B can guide their streamer 60 down under the other streamers 60 and can bring it up through the middle of the array of streamers 60 in the potentially cleared area behind the vessel 30. The steamer 60 can then be pulled up to the vessel 30 and can avoid the other streamers 60 and towlines 62. This will allow operators to deploy and retrieve the streamers 60 individually and can even allow for repair of a steamer 60 while all of the other streamers 60 remain in the water. Use of a single ROTV 200 on the tail of the streamer 60 as in the system of FIG. 6A may also be capable of the same form of deployment and retrieval.

Figure 7A:
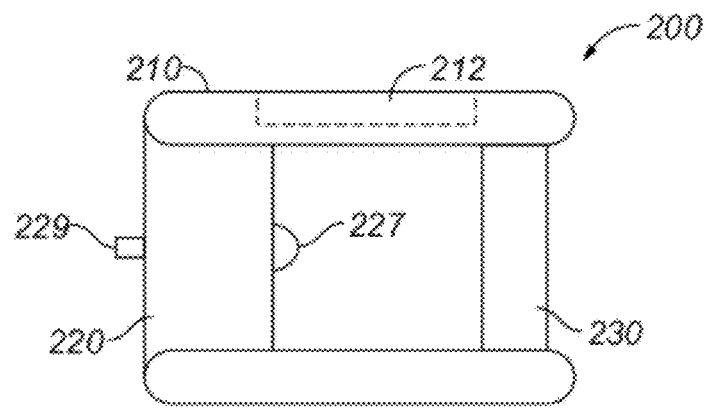
FIGS. 7A-7B shows a Remotely Operated Towed Vehicle (ROTV) in more detail.
Figure 7B:
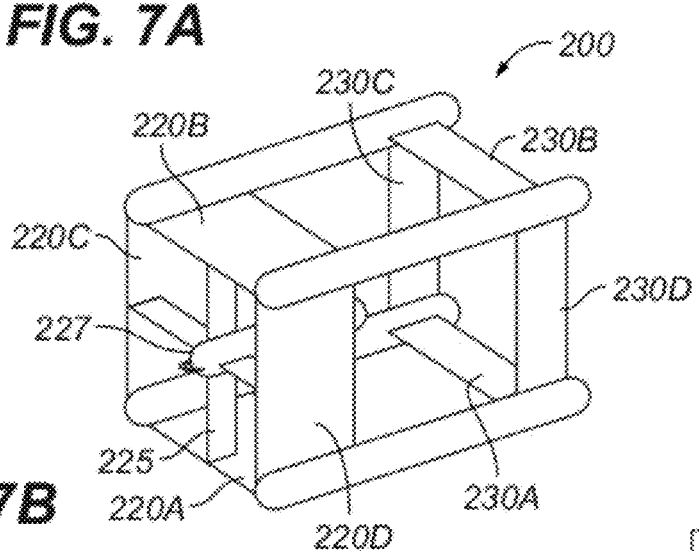

FIGS. 7A-7B show one embodiment of the Remotely Operated Towed Vehicle (ROTV) 200 in more detail. In general, this ROTV 200 is a hybrid type of device incorporating elements of ROVs, AUVs, and gliders. One suitable example for the ROTV 200 is a TRIAXUS Towed Undulator available from MacArtney Underwater Technology Group.

For towing the ROTV 200, a tow cable (not shown) having power conductors and communication lines connects to the leading edge 49 of a center foil 227. As shown, the ROTV 200 has four tubulars 210 interconnected in their front section by foils 220/225 and in their trailing section by flaps 230. The foils 220/225 and flaps 230 have a wing shape. Central foils 225 interconnect the leading foils 220 and support the horizontal foil 227 in the front of the ROTV 200. These central foils 225 help keep the ROTV 200 leveled in its roll direction. The trailing flaps 230 are controllable with the upper and lower flaps 230A-B controlling pitch and the right and left flaps 230C-D controlling yaw.

Four actuators or motors (not shown) installed in each of the tubulars 210 move these flaps 230A-D to control the pitch and yaw of the ROTV 200 as it is towed. The tubulars 210 have compartments 212 for holding various components besides the motors, gears, and position sensors for the flaps 230A-D. For example, these compartments 212 can have a GPS receiver, an inertial navigation system, a depth sensor, a pitch sensor, a roll sensor, a heading sensor, etc., discussed below.

While being towed, the horizontal flaps 230A-B produce up and down forces to move the ROTV 200 vertically, while the vertical flaps 230C-D produces starboard and ports force in order to move the ROTV 200 horizontally (laterally). Typically, the ROTV 200 will be towed in a neutral position with the flaps 230 being adjusted intermittently to maintain the ROTV 200 as is. Some situations, such as rising to the surface, will require more aggressive movement of the flaps, especially when connected to a streamer. Braking for the ROTV 200 can use some of the techniques discussed previously. Additionally or in the alternative, the flaps 230 can be turned inward or outward to increase the ROTV's drag while being towed.

Figure 8:
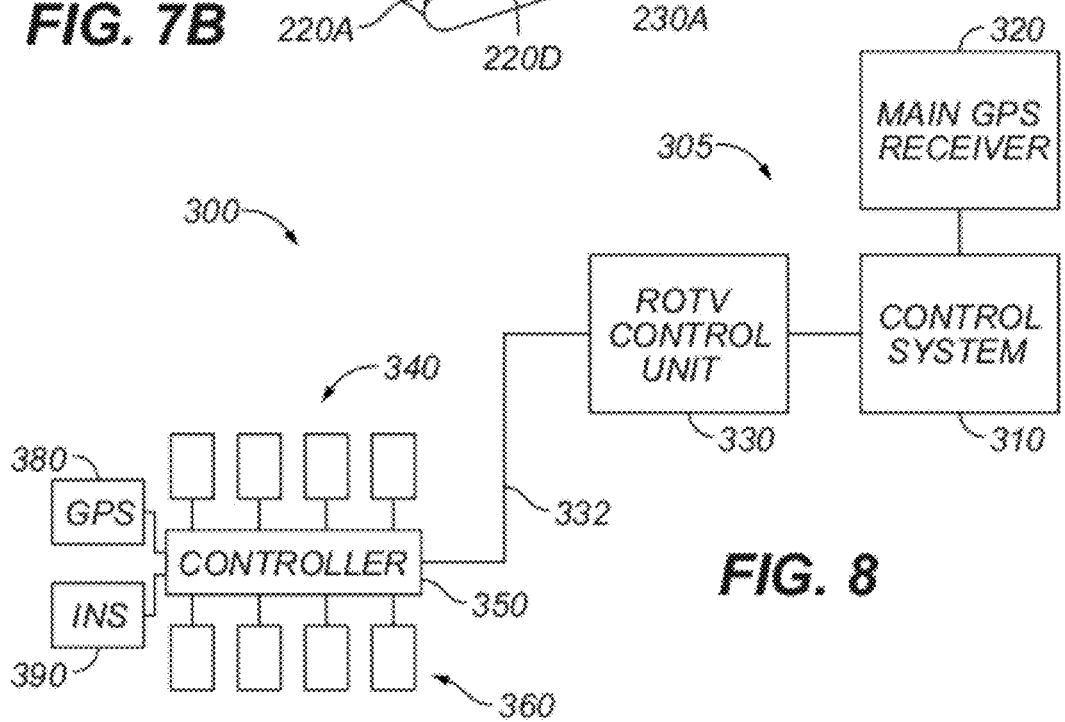
FIG. 8 schematically illustrates a control system for controlling the ROTVs and dead reckoning its location while being towed.

FIG. 8 schematically illustrates elements of a control system 300 for controlling controllable vehicles (e.g., ROTVs 200) and determining their locations while being towed in a marine seismic system of the present disclosure. Vessel components 305 on the vessel 30 include a main control system 310, which has a main GPS receiver 320 for obtaining GPS readings. As before, this control system 310 can be an instrumentation control system such as Orca® available from ION Geophysical. The control system 310 interfaces with (or is integrated with) a control unit 330, which controls and monitors the various vehicles (e.g., ROTVs) used for the streamers in the array. An example of a suitable control unit 330 for an ROTV 200 of FIGS. 7A-7B is the topside unit used for the TRIAXUS ROTV.

Connected by communication and power lines 332, the control unit 330 interfaces with a local controller 350 on a controllable vehicle 340, such as ROTV 200 of FIGS. 7A-7B, for example, or some other controllable device disclosed herein. The controller 350 communicates sensor data from the device's sensors 360 to the control unit 330. After interfacing with the navigational information in the main control system 310, the control unit 330 sends navigational instructions back to the controller 350, which operates the various fin motors 370 appropriately. Navigating the controllable vehicle 340 can involve both real-time control and preprogrammed trajectories.

The controller 350 communicates with the device's integrated sensors 360 and to the motors 370 for the flaps. The integrated sensors 360 for controlling the device 340 include a depth sensor, a pitch sensor, a roll sensor, and a heading sensor. The depth can be measured with a pressure sensor, while pitch and roll can be measure by bi-axial inclinometers. The yaw or heading can be measured using a fluxgate compass, and an altimeter can also be used.

In addition to the integrated sensors 360, the controller 350 can connect to position sensors that monitor the motors and flaps to keep track of the positions of these flaps to feedback to the control unit 330. All of these integrated sensors (i.e., pitch, roll, heading, and motor position) provide feedback for the control system 310 to control the flaps to direct the controllable vehicle 340 and keep it from rolling.

Aside from these sensors, the controller 350 on the controllable vehicle 340 communicates with a GPS receiver 380. As noted previously, when the controllable vehicle 340 is brought to the surface, the antenna for the GPS receiver 380 can be exposed above the water's surface to obtain GPS readings. Yet, such readings are expected to be intermittently made. Likely, when used in icy or obstructed waters, the controllable vehicle 340 may be towed under ice floes for several continuous hours or even days before it can be resurfaced to obtain GPS readings. Therefore, the controllable vehicle 340 also has an Inertial Navigation System (INS) device 390 used for determining the relative position or location of the controllable vehicle 340 between direct GPS readings with the GPS receiver 380.

In general, the INS device 390 can use components known in the art, such as a processor, accelerometers, and gyroscopes, and uses dead reckoning techniques to determine position, orientation, direction, and speed of the controllable vehicle 340 continuously. Depending on how long the controllable vehicle 340 must be dead reckoned in this way, the drift error inherent to the INS device 390's measurement of acceleration and angular velocity becomes increasingly magnified. Accordingly, the navigation is preferably corrected by periodic GPS readings. Even with an error of a fraction of a nautical mile per hour for position and tenths of a degree per hour for orientation, error in the INS device 390's determination can be significant if the controllable vehicle 340 must remain below the surface for extended periods. Discussion below describes a feedback loop that can be used to correct the INS device 390's determination.

4. Control Loop

Figure 9:
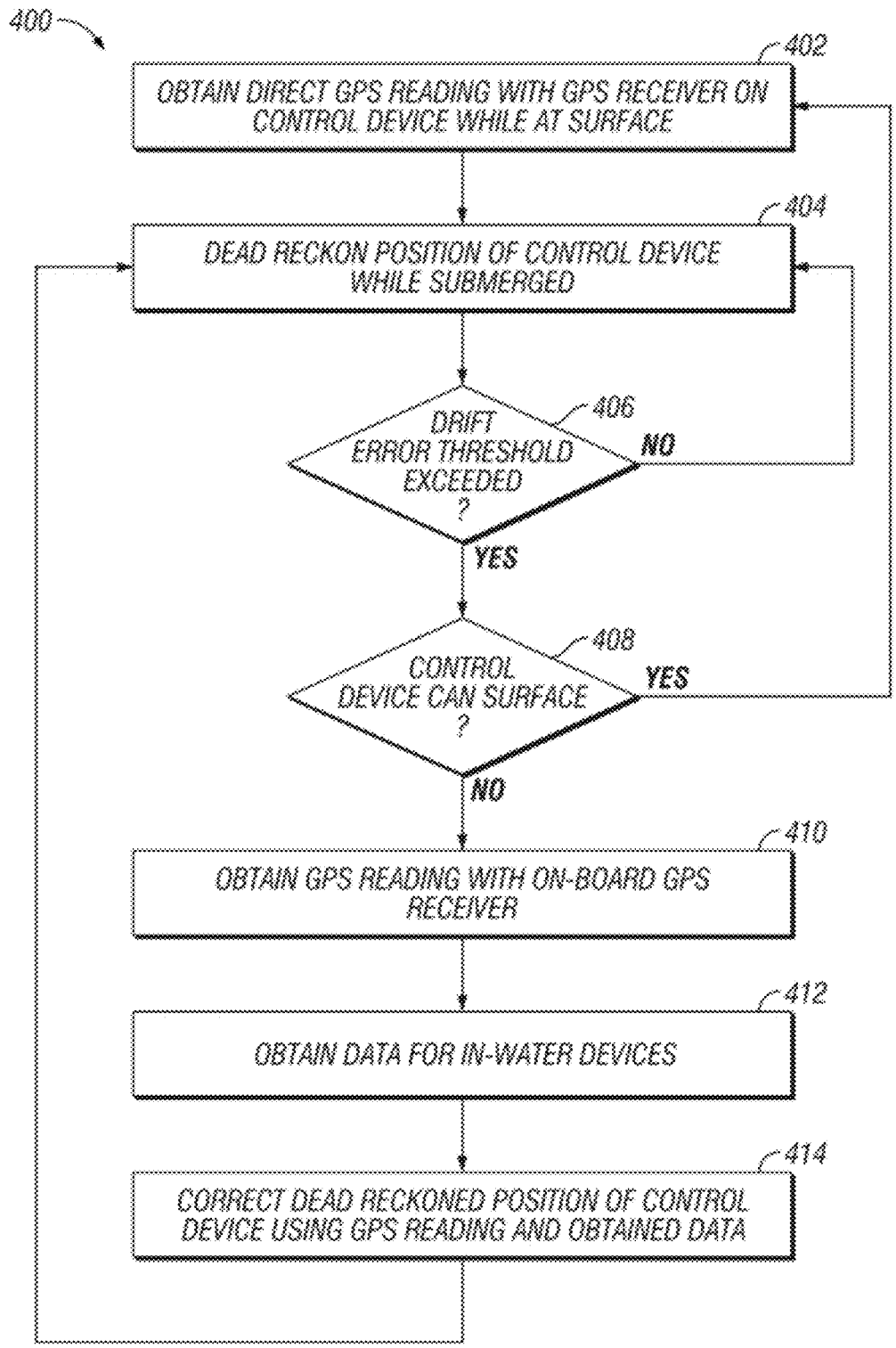
FIG. 9 shows a control loop for dead reckoning and correcting drift in an Inertial Navigation System for a towed vehicle.

FIG. 9 shows an example of a navigational feedback loop 400 for determining the position of a controllable vehicle (e.g., 340; FIG. 8), such as an ROTV, and correcting that position. Initially in the loop 400, the controllable vehicle 340 obtains a direct GPS reading using its GPS receiver 380 (Block 402). This is done while the area above the controllable vehicle 340 is free of ice floes or other obstructions. After the controllable vehicle 340 submerges again, the INS device 390 and control system 310 begin determining the position of controllable vehicle 340 as it is towed (Block 404). This is done by taking the starting location or fix from the GPS reading and measuring direction, speed, and time to calculate the position of the controllable vehicle 340 going forward from that starting position using dead reckoning techniques.

Unfortunately, this form of inertial navigation is not precise and drift error accumulates over time. As long as the drift error is low enough, this inertial navigation can continue. At some point, the control system 310 determines whether drift error has exceeded some acceptable range that depends on the implementation (Block 406). If not, then the control system 310 can continue dead reckoning (Block 404) until the drift error is too large.

Once the drift error is large (due to a long period of dead reckoning, fast survey speeds, long survey distance, or a combination of the these), the control system 310 seeks to correct the error by either resurfacing the controllable vehicle 340 to obtain a new GPS reading that fixes the device 340's position or by integrating the INS device's dead reckoning with feedback from the vessel's main navigation system. Accordingly, the control system 310 determines from manual input or from the sensors (sonar, ice profiler, fathometer, etc.) on the controllable vehicle 340 whether the device 340 can rise to the surface (Decision 408) to obtain another GPS reading to fix the device's location (Block 402) to repeat the process.

If the controllable vehicle 340 cannot surface, then the control system 310 obtains a GPS reading using the on-board GPS receiver 380 of the vessel (Block 410). This GPS reading gives the location of the tow vessel 30. As an additional supplement, the system 310 obtains data from the various in-water devices (i.e., controllable vehicle 340, streamer, sensors, etc.) (Block 412). This data can be used to determine the relative position of the controllable vehicle 340.

Figure 10:
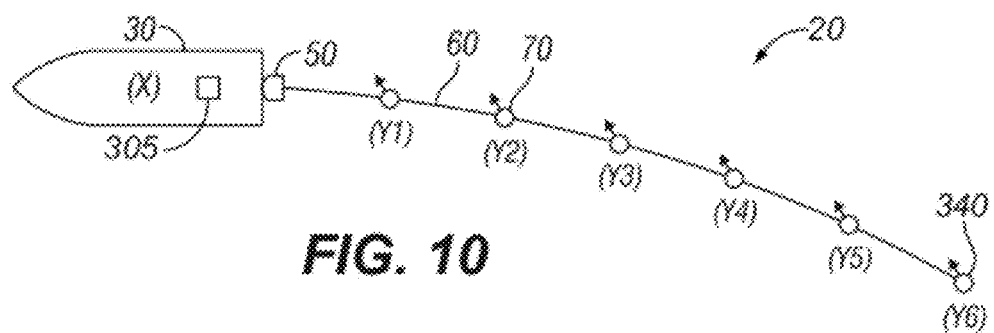
FIG. 10 shows a steamer with sensors positioned thereon for determining the shape of the streamer using a GPS reading for a vessel, known sensor locations, a known controllable vehicle location, and various compass headings.

For example, FIG. 10 shows the marine seismic system 20 having a steamer 60 with cable compasses or sensors 70 positioned thereon for determining the shape of the streamer. Here, the determination uses a GPS reading (x) from the vessel components 305, known sensor locations (Y1-Y5), known controllable vehicle location (Y6) along the streamer 60, and various compass headings from cable compasses 70 or the like. As shown, data about the sensors 70 and controllable vehicle 340 on the streamer 60 (including each of their positions (Y) on the streamer 60, compass headings corrected by declination, and the like) can be used to estimate the location of points on the streamer 60 and derive the streamer's shape. Combined with the vessel's GPS reading (X) using the on-board GPS receiver of the vessel components 305, all of this data can be integrated with the position data from the INS device (390; FIG. 9) to correct its drift error and provide more absolute position information about the location of the streamer 60 and its sensors 70 in GPS coordinates or the like.

Figure 11:
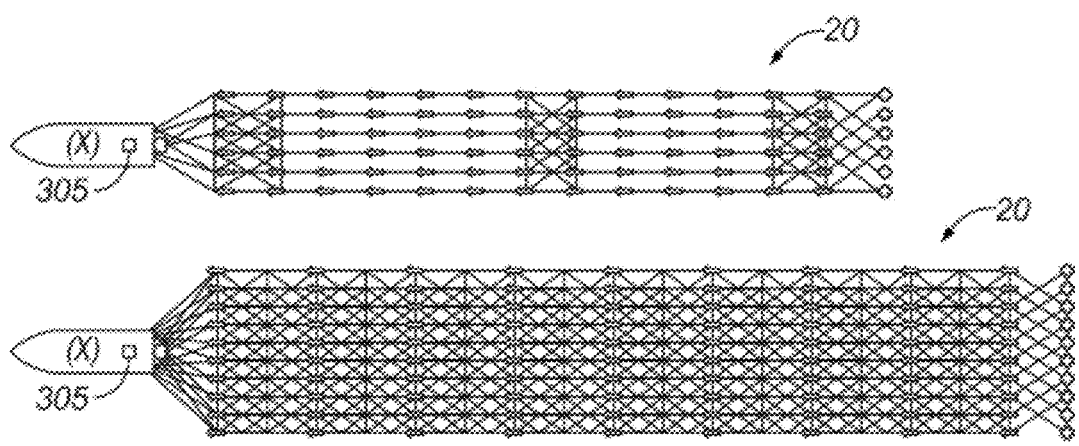
FIG. 11 shows different arrangements of acoustic systems for performing acoustic cross-bracing to determine streamer positions.

Additionally, acoustic positioning techniques can be used along with the GPS reading using the on-board GPS receiver of the vessel components 305 to correct drift error of the INS device and provide more absolution position information. As shown in FIG. 11, for example, different arrangements of acoustic systems for performing acoustic cross-bracing are shown for the system 20. Such acoustic cross-bracing can be used to determine the streamers' positions.

Additionally, a short base line can be obtained by using a transducer on the vessel 30 to "ping" an acoustic sensor on the controllable vehicle 340 toward the tail end of the streamer 60 to determine the vehicle's position. Also, a long base line can be obtained by using one or more other transducers on the seabed (a minimum of two transducers are needed for a long base line system) to "ping" a sensor on the controllable vehicle 340 to determine its position. Finally, even the control sensor readings from the controllable vehicle 340 and the movements directed to the controllable vehicle 340 by the vessel components 305 (i.e., control unit 330) can be integrated with the on-board GPS reading (X) to determine the absolute position of the controllable vehicle 340. These and other techniques available in the art can be used.

Regardless of how the INS device's position is integrated with feedback from other navigation components, the vessel components 305 corrects the dead reckoned (relative) position of the controllable vehicle (See Block 414 in FIG. 9) so the system can continue using the INS device 390 with less drift error. The entire process of dead reckoning and correcting the drift error may continue as long as the controllable vehicle 340 remains submerged below the surface. Eventually, should conditions allow it, the controllable vehicle 340 is directed to the surface to obtain a direct GPS reading to fix its location once again (Block 402 in FIG. 9). This new GPS reading provides a new starting point that can then be used for dead reckoning and correcting while the controllable vehicle 340 remains submerged in further surveying.

C. Declination Correction for Marine Seismic Survey

As noted previously, position information of streamers 60 in a seismic survey can be obtained using one or more compasses, acoustic measurements, or the like to determine positions of the streamers 60 and their relation to one another. Although reference is made to cable compasses, the teachings of the present disclosure can be used to correct any geomagnetic field measurement device, such as correcting a magnetic heading device to true north. The position measurements can be performed using instruments or sensors mounted in the streamers 60 themselves, and the measurements can be used in standard marine surveys with a closed traverse or in surveys in icy waters with an open traverse. In the end, either form of marine survey may benefit from the correction techniques disclosed herein.

As noted previously, measuring instantaneous declination is useful for correcting the magnetically determined positions of the streamers 60 that are obtained from cable compasses or the like. This correction is especially useful at higher latitudes because more magnetic variation may occur at high latitudes due to atmospherics. Finally, ice in the water inhibits the use of tail buoys and limits measurements of GPS readings at the end of the streamers 60 as discussed previously so declination corrections can improve accuracy.

As noted above, one way to obtain needed GPS readings at the tail of the streamer 60 involves using floating or tethered buoys (e.g., 82 in FIG. 2A) or involves moving a controllable device to the surface to obtain GPS readings when able (FIGS. 2D, 3A-3B, 4, 5, and 6A-6B). Dead-reckoning and inertial navigation can then be used to track the location of the streamers 60 between periodic GPS readings as described with reference to FIGS. 7A-7B, 8, and 9. Part of these calculations may be based on a declinometer in the controllable device at the tail end of the streamer 60 as described previously with reference to FIGS. 2B and 4.

When used, a declinometer can correct the compass readings of the cable compasses used for positioning the streamers 60. Towing a declinometer behind the vessel 30, such as on the tail end of a streamer 60 or in a controllable device on the streamer 60, positions the declinometer away from the vessel 30. In this position, the declinometer can avoid issues with the vessel's magnetic field. Rather than towing the declinometer at the end of the streamer 60, the declinometer can be towed on its own directly behind the vessel 30, typically at a distance of 2½ times the vessel's length to reduce interference from the vessel's magnetic field.

Preferably, the declinometer uses vector-based magnetometers to measure directional components of the earth's magnetic field relative to the magnetometers' spatial orientation. Towing the declinometer on the streamer 60 or behind the vessel 30 moves the magnetometer so continual correction for the magnetometers' spatial orientation using inertial measurements and the like may be required. This is especially true when the magnetometer in the declinometer is a 3-axis strapdown-type of magnetometer as opposed to a scalar-type of magnetometer that measures only total field.

In most situations, however, any induced magnetism from the vessel 30 compared to the increased motion of such a towed magnetometer may not be worth the tradeoff so that towing the declinometer behind the vessel 30 is less desirable. For these reasons, the towing vessel 30 may have a declinometer system installed thereon. Being on the vessel 30, however, the declinometer system must compensate for the hard and soft iron effects caused by the vessel 30. The discussion that follows provides details for calibrating and using a declinometer system on the vessel 30 for performing a marine seismic survey. Again, the survey may or may not be done in icy or obstructed waters where GPS readings of the streamers 60 are hard or impossible to obtain on a continual basis.

FIGS. 12A-12B schematically illustrate a control system 500 for a vessel 30 towing streamers 60. Although the vessel 30 is shown towing one streamer 60 from a skeg 50 in FIG. 12A, more streamers 60 may be used as represented in FIG. 12B. Each streamer 60 has a number of magnetic heading devices or cable compasses 65 disposed along its length for determining and controlling the streamer's location during towing. Using a declinometer system 520, the control system 500 obtains declination readings at the vessel 30 and corrects the readings of the cable compasses 65 spatially and temporally based on the declination readings. Moreover, the control system 500 can use features of an instrumentation control system such as Orca® available from ION Geophysical and can use similar features as discussed previously for controlling the positions of the streamers 60.

The control system 500 has a control unit 510 that controls and monitors the various streamers 60 in the array as well as other sensors. Although not illustrated in detail, it will be appreciated that the control unit 510 can use components known in the art, such as processors, storage devices, memory, software, user interfaces, and the like.

To control the streamers 60, for example, the control unit 510 interfaces with towed vehicles, controllable devices, fins, vanes, and other components (not shown) for steering and directing the streamers 60 as disclosed herein and used in the art. To monitor position and determine declination, the control unit 510 interfaces with the cable compasses 65 on the streamers 60 and interfaces with a magnetometer 550, an inertial measurement unit 560, and a GPS heading device 570 of the declinometer system 520 on the vessel 30. The GPS heading device 570 obtains GPS readings at the towing vessel 30, and the magnetometer 550 obtains three directional magnetic components and can be a fluxgate magnetometer, a strapdown-type of magnetometer, or the like. The GPS heading device 570 can preferably have two GPS receivers (not shown) to obtain GPS readings and calculate a geodetic bearing according to techniques known and used in the art.

The inertial measurement unit 560 obtains three directional components of the vessel's motion. For example, the unit 560 can have a pitch sensor, a roll sensor, and a heading sensor. Pitch and roll can be measured by bi-axial inclinometers. The yaw or heading can be measured using a fluxgate compass, and other devices can also be used.

To help illustrate the various orientations used herein, discussion turns to FIGS. 12C-12D showing geomagnetic and vessel coordinate systems. FIG. 12C schematically shows elements of the geomagnetic field for a point in space. The elements include a north component $X_e$, an east component $Y_e$, and a vertical component $Z_e$. From these, a horizontal intensity H, a total intensity F, an inclination angle I, and a declination angle D (measured clockwise from true north to the horizontal component) can be derived.

FIG. 12D schematically shows a vessel's coordinate system with attitude angles measured relative to geographical north and a horizontal plane. As conventionally done, the vessel's inertial coordinate system has an x-component $X_s$ (measured positive to the bow), a y-component $Y_s$ (measured positive to starboard), and a z-component $Z_s$ (measured positive down to the keel). As the vessel moves, it can have various attitude angles in its coordinate system relative to geographical coordinates. Heading α is measured about the vertical axis ($Z_s$), while roll β is measured about the longitudinal axis ($X_s$). Pitch γ is measured about the cross axis ($Y_s$).

Coupled to the vessel's motion, the magnetometer 550, which can be a three-axis strapdown-type of magnetometer, measures the geomagnetic field relative to the vessel's spatial orientation. Because of this, the magnetometer's measurements must be unrotated for proper referencing to an absolute coordinate system (i.e., true north, latitude, longitude, etc.) using techniques known in the art.

Figure 13:
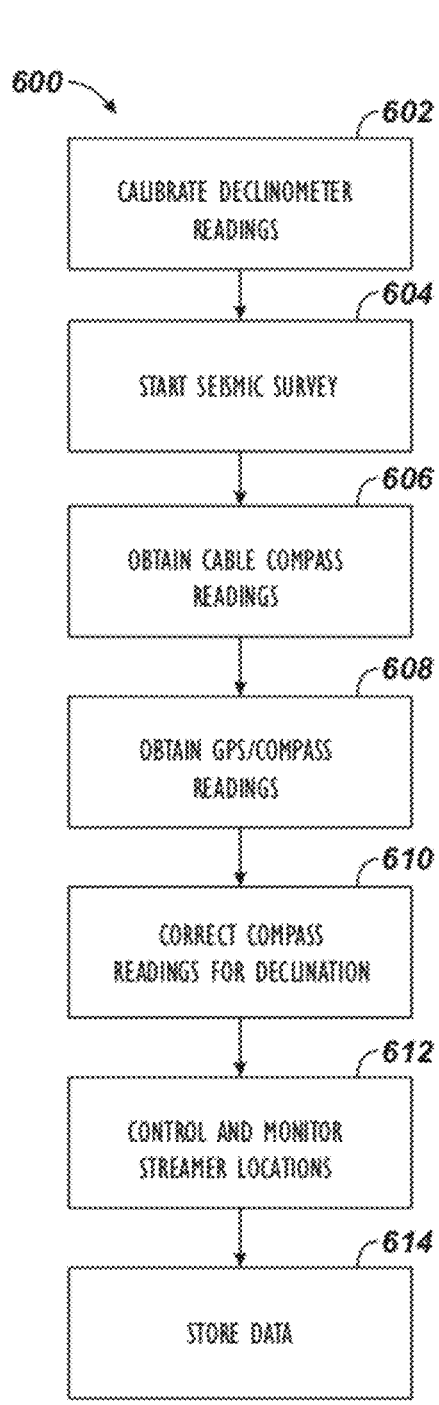
FIG. 13 illustrates a general flow diagram of a seismic survey using declination determined at a vessel.

FIG. 13 illustrates a general flow diagram of a seismic survey 600 using declination determined at a vessel 30 with the control system 500 of FIGS. 12A-12B. To conduct the seismic survey, operators initially calibrate the on-board declinometer system 520 on the vessel 30 (Block 602). As described below, the calibration process allows the control system 500 to account for magnetic effects of the vessel 30 in making magnetometer readings and the like.

Once calibration is done, operators start the seismic survey (Block 604). As noted previously, the survey involves the tow vessel 30 towing one or more streamers 60 in an array behind the vessel 30 over an area of interest. Source signals reflect from formation features, and the acoustic sensors on the streamers 60 obtain seismic signals for analysis. To combine all of the data and ultimately image the area of interest, the seismic signals must be correlated to information about the location of the sensors on the streamer 60 and the time when signals are received during the survey. This can use many of the known techniques for marine seismic surveying.

As is customary during the marine seismic survey, the control unit 510 obtains compass readings from the streamers' cable compasses 65 (Block 608) and obtains GPS readings from one or more GPS receivers. For example, the various cable compasses 65 on the streamers 60 obtain compass readings at points along the streamers 60, and the GPS receiver 570 on the tow vessel 30 obtains GPS readings of the vessel's location. If possible, GPS receivers (not shown) on tail buoys or other controllable devices towed on the streamers 60 can also obtain GPS readings, although this may be intermittent as discussed previously.

The readings from the cable compasses 65 are then corrected for current declination, which can be accounted for using the calibration and calculation techniques described in more detail below (Block 610). Briefly, raw compass readings from the streamer's compasses 65 are typically stored without being corrected for current declination determined at the vessel 30. To make this correction, the control unit 510 determines differences in a first geodetic heading derived using GPS data from the GPS heading device 570 versus a second geodetic heading derived using the 3-component magnetometer data of the magnetometer 550. From this, the control unit 510 computes a magnetic declination. Additionally, the control unit 510 applies motion compensation from the 3-component inertial measurement unit 560 to the magnetic declination. The magnetic declination can then be applied to the raw compass readings from the compasses 65, and the resulting data can be stored as corrected compass readings in the system's database 542.

Using navigating software and knowing the arrangement of the streamers 60, spacing of the sensors and compass readings, cross-bracing determinations, and the like, the control unit 510 can control the location of the streamers 60 as desired for the survey (Block 612). All of the relevant data on the streamers' locations, acoustic sensor readings from the steamers 60, compass readings, GPS readings, declination, and the like can then be stored in the database 542 for later processing and analysis common to marine seismic surveying so that the area of interest can be imaged.

Given this general overview of a seismic survey that determines declination with a declination system 520 on the vessel 30, discussion now turns to particulars involved in calibrating the vessel's declination system 520 to determine and use declination to correct compass readings on the streamers 60.

1. Calibration Techniques

Before correct magnetic declination can be determined with the control unit 510 on the towing vessel 30, various calibrations steps must be performed. In one calibration, the control unit 510 calibrates for hard and soft iron effects by simultaneously solving the 3D hard and soft iron effects of the steel towing vessel 30 on the various data readings obtained with the devices 550, 560, and 570 on the vessel 30.

To do this, the control unit 510 is calibrated for induced magnetization to compensate for the induced magnetic forces caused by the vessel's orientation within the earth's magnetic field. This calibration uses a Fourier series deviation curve. Additionally, the control unit 510 performs interpolated infield referencing from remote base stations or observatories to estimate the correct magnetic declination at the calibration location. Here, the control unit 510 uses data from base stations situated some distance away from the calibration location. Each of these calibration steps is described in detail below.

a. Calibration Processes

Calibrating for hard and soft iron effects from the tow vessel 30 with the control unit 510 is based on the known characteristics of the earth's magnetic field and the ferromagnetism of the steel vessel 30. As is known, the earth's geomagnetic field has a magnitude, an inclination with respect to horizontal, and a declination with respect to true north. These field components can be decomposed into the geometrical components of $M_x$, $M_y$, and $M_z$, which can be obtained with the system's magnetometer 550. These components correspond to the typical coordinate system or frame convention for magnetometers. This frame convention is often referred to as NED, in which the X-axis points North in the horizontal, the Y-axis points East in the horizontal, and the Z-axis point down vertically.

The earth's total magnetic field (B) at a particular location comprises the sum of three physical components: the main field ($B_m$) in the core of the earth, the crustal field ($B_c$) near the crust's surface, and the most variable atmospheric field ($B_d$). These three fields $B_m$, $B_c$ and $B_d$ are accounted for during calibration of the declinometer.

The vector of the earth's magnetic field B has components defined in a geodetic coordinate system. As noted previously in FIG. 12D, the geodetic coordinate system for the earth's geomagnetic field has an x-component $X_e$ (measured positive to the north), a y-component $Y_e$ (measured positive to the east), and a z-component $Z_e$ (measure positive down towards the center of the earth). The main field ($B_m$) is the largest component of the total magnetic field (B), comprising about 98%, and it can be predicted with a number of models. Some typical models include International Geomagnetic Reference Field (IGRF), World Magnetic Model (WMM), Enhanced Magnetic Model (EMM), and BGS Global Geomagnetic Model (BGGM). One or more of these models are used in the calibration procedure outlined below.

For its part, the crustal field ($B_c$) can only be known through local magnetic surveys, which in most cases would not be available. This can be dealt with by calibrating in the water as deep as possible to minimize $B_c$. The variable atmospheric field ($B_d$) can be estimated by interpolation from the data provided by magnetic observatories established in the region being surveyed. Such observatories are strategically located around the world and data from them can be used to estimate the variable atmospheric field ($B_d$) in the region of interest.

Two types of ferromagnetism are of interest in the calibration of the system 500. First, the towing vessel 30 is constructed of iron while in the magnetic field of the earth so that the vessel 30 acquires remnant or permanent magnetism during the physical process of its construction. This ferromagnetism is called "hard iron" magnetism and is constantly aligned with the vessel 30 even as its orientation changes. Thus, as the magnetometer 550 obtains readings, the hard iron magnetism of the vessel 30 constantly adds to the output of each axis of the magnetometer 550.

The second type of ferromagnetism of interest is induced magnetism created by the interaction of the earth's magnetic field and the iron of the vessel 30. This induced magnetism is called "soft iron" magnetism, and it varies (fluctuates) as the vessel 30 changes orientation in the earth's magnetic field. Computing the soft iron effects is more intensive than hard iron effects and involves determining an angle (phi) at which the horizontal magnetometer readings $M_x/M_y$ are rotated in the horizontal. The computing also involves determining a ratio (R) of major to minor axes in the deviated, horizontal magnetometer readings $M_x/M_y$. When combined, the angle (phi) and the ratio (R) compensate for induced magnetism (soft iron) in the horizontal plane. Particular equations for indentifying the angle, magnitude of the major axis, rotation matrices, and scale factor for the major axis are known in the art and are not restated in fine detailed herein for the sake of brevity.

Both of these types of ferromagnetisms have effects in both the horizontal planes ($M_x$, $M_y$) and the vertical plane ($M_z$). Therefore, the calibration process preferably compensates for the hard and soft iron magnetism in both the horizontal and the vertical planes to determine correction parameters.

b. Flow Chart

Figure 14:
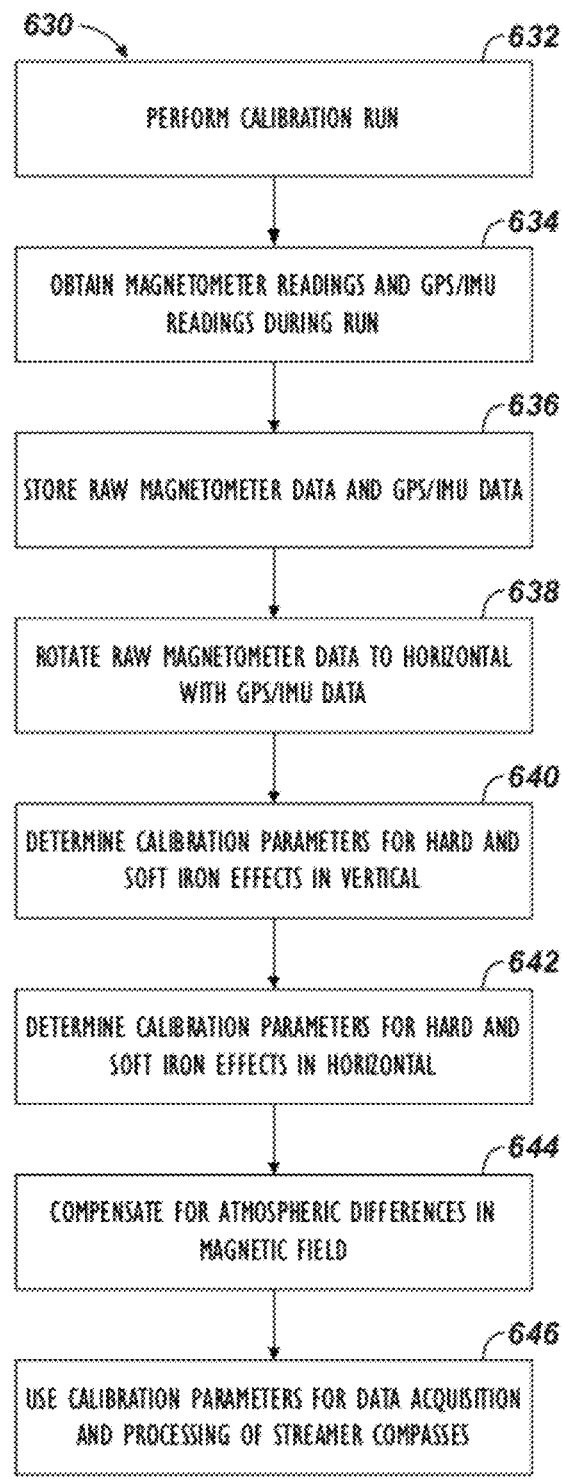
FIG. 14 shows a calibration process in flow chart form for determining declination at a tow vessel.

FIG. 14 shows a calibration process 630 in flow chart form, which can be implemented as software or the like in a programmable processor of a control unit as disclosed herein. The calibration process 630 solves for an azimuth of the declinometer system 520 with respect to magnetic north. To do this, the process 630 uses rotated, compensated components of an observed magnetic field obtained by magnetometer readings ($M_x$, $M_y$ and $M_z$) as the vessel 30 traverses a calibration pattern. The magnetic azimuth from this observed magnetic field is then compared to the azimuth obtained with the GPS/IMU devices 560/570 with respect to true north, which gives a declination for correcting the various compass readings on the streamers 60.

Figure 15A:
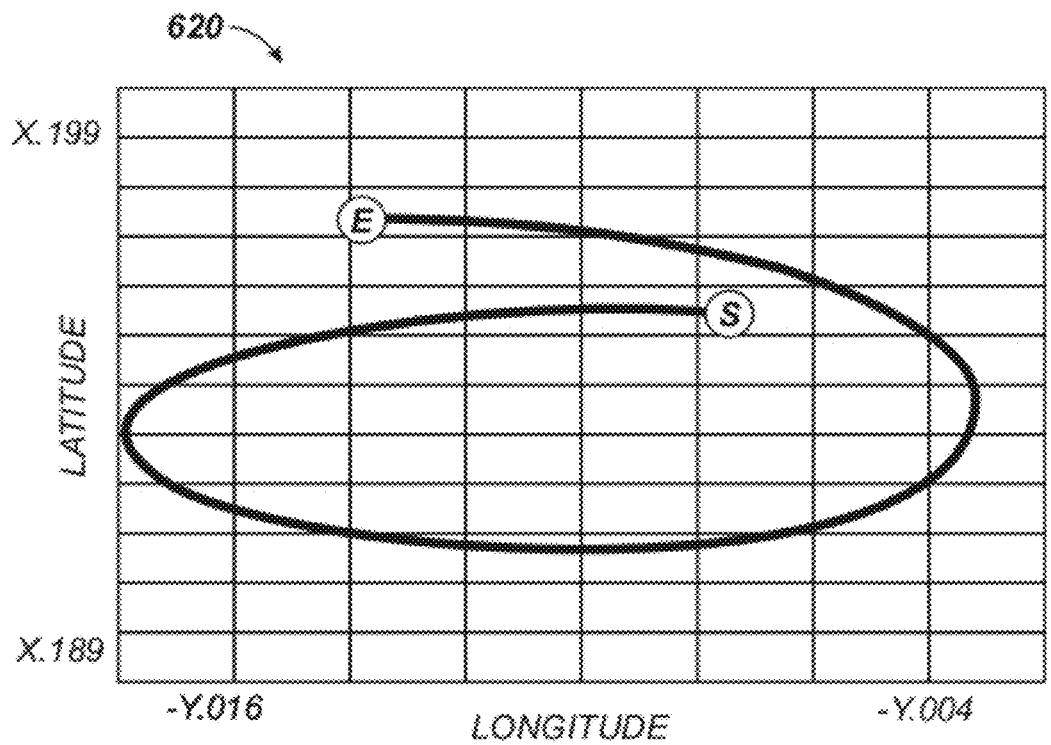
FIGS. 15A-15B shows two calibration patterns for a vessel.
Figure 15B:
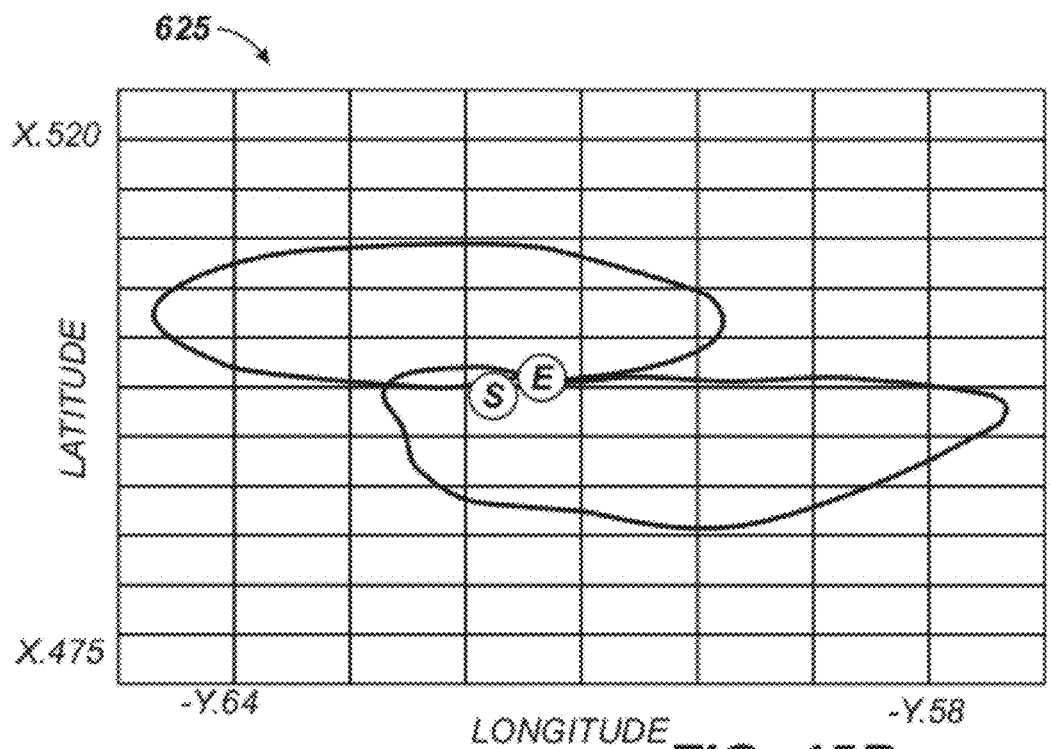

Initially, operators perform a calibration run with the vessel 30 to calibrate the declinometer system 520 (Block 632). Here, the vessel 30 is sailed in a circular pattern so that the vessel's heading passes through all azimuths, where azimuth refers to the angle in a horizontal plane measured clockwise from a north bearing. Two patterns 620/625 for the vessel 30 can be used as shown in FIGS. 15A-15B. As the vessel 30 sails the pattern 620/625, the control system 510 records calibration data, including GPS/IMU heading, pitch and roll from the inertial measurement unit 560; the 3-axis readings of $M_x$, $M_y$ and $M_z$ from the magnetometer 550; the GPS readings of latitude and longitude from the GPS receiver 570; and time stamps for each of the preceding data (Block 634). This calibration data is then stored for processing as detailed below to derive parameters for correcting future readings (Block 636).

For the calibration, the control unit 510 rotates the raw magnetometer data to horizontal using the GPS/IMU data obtained (Block 638). Once this is done, various calculations are performed to find calibration parameters that can be used to correct compass readings and seismic data based on changes in declination experienced during a seismic survey. As part of these calculations, the control unit 510 determines calibration parameters for hard and soft iron effect in the vertical orientation (Block 640) and in the horizontal orientation (Block 642).

With the calibration parameters calculated, the control unit 510 also performs calculations that can compensate for atmospheric difference in the earth's magnetic field (Block 644). This can be done using infield referencing of data from surrounding observatories as explained in more detail later. In the end, once calibration is done, the control unit 510 can use the calibration parameters for data acquisition and processing for the streamer compasses to account for changes in declination when performing or analyzing a seismic survey (Block 646).

c. First Calibration Stage

With an understanding of the overall calibration process 630 described above, discussion now turns to FIG. 16A, which shows a first calibration stage 650 in more detail. (The steps of the stage 650 can be implemented as software or the like in a programmable processor of a control unit as disclosed herein.) After the vessel 30 traverses the pattern (620/625 of FIGS. 15A-15B) and obtains readings in all azimuths as noted previously, the control unit 510 first rotates the raw magnetometer data ($M_x$, $M_y$, $M_z$) from the magnetometer 550 to horizontal using the pitch and roll obtained from the inertial measurement unit 560 (Block 652). To do this, a rotation is applied to the magnetometer data to remove the roll (i.e., bank angle between Y-axis and horizontal), and another rotation is applied to remove the pitch (i.e., elevation angle between the X-axis and horizontal). This rotation aligns the local x-y horizontal plane with a reference X-Y horizontal plane and can use rotation matrices and calculations known in the art.

After this, the control unit 510 solves for the rotated vertical $M_z$ component as a function of GPS/IMU azimuth using a fourth-order Fourier-series deviation curve and least squares. This curve fitting determines vertical soft iron parameters (9 coefficients) to compensate for soft iron effects in the vertical plane (Block 654).

Figure 17:
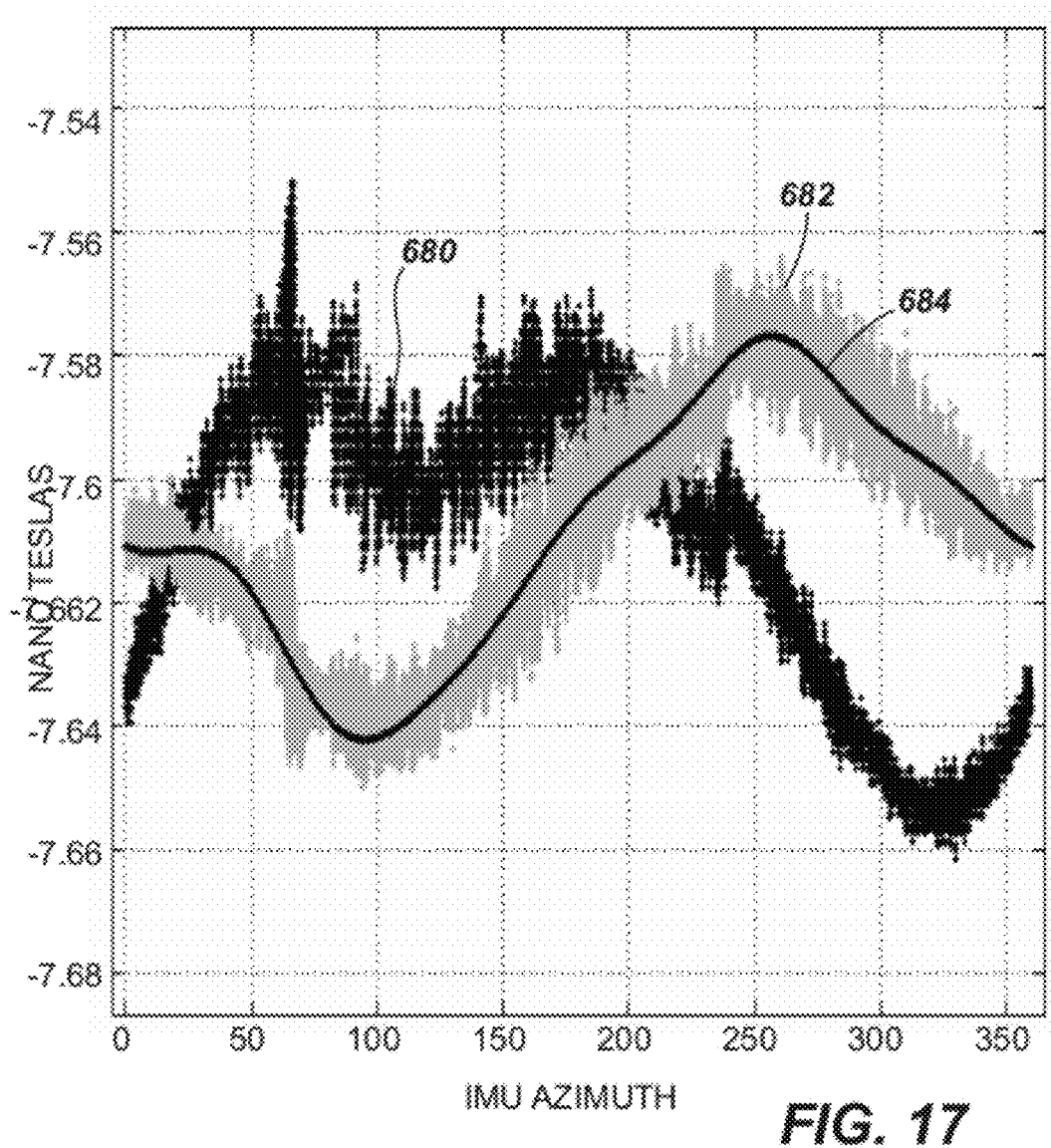
FIG. 17 graphically illustrates the steps to solve for a rotated vertical magnetometer component ($M_z$) as a function of azimuth from GPS/IMU readings using a fourth-order Fourier-series deviation curve and least squares.

FIG. 17 graphically illustrates this step to solve for the rotated vertical component $M_z$ as function of the azimuth from the GSP/IMU readings using a fourth-order Fourier-series deviation curve and least squares. Here, the raw vertical component $M_z$ is shown as line 680, and the rotated vertical component $M_z$ is shown as line 682. The solved curve for the rotated vertical component $M_z$ is shown as line 684 with the nano-Teslas of the rotated vertical component $M_z$ graphed as a function of IMU azimuth from the inertial measurement unit 560. As a result of these steps, the calibration process 630 obtains parameters to compensate for the induced magnetism (soft iron effects) in the vertical caused by the vessel 30. The vertical soft iron parameters come from the nine coefficients of the Fourier series of the best-fit line 684.

Returning now to FIG. 16A, the control unit 510 iterates over several steps (Blocks 656 to 665) after solving the vertical soft iron parameters to then determine parameters for compensating for remnant magnetism (hard iron effects) in the vertical.

While iterating over a sequence of vertical adjustment factors $M_{z0adj}$ and for every data point in the calibration circle traversed by the vessel 30, the process solves for $M_{z0}$=Fourier (a function of azimuth) minus the adjustment factor $M_{z0adj}$ and divides $M_{z0}$ by cos(pitch)*cos(roll) (Block 636). (In the calculations, $M_{z0adj}$ represents the value of the remnant magnetization in the vertical that minimizes the standard deviation (SD) of the horizontal ellipse ($M_h$) in nanoTeslas). This operation essentially "unrotates" the vertical azimuth $M_{z0}$ to the vessel's orientation. Additionally, the absolute value of unrotated vertical azimuth $M_z$ is decreased by unrotated azimuth $M_{z0}$. The decrease in $M_z$ alters the rotated $M_x$ and $M_y$ components. Therefore, the control unit 510 rotates the magnetometer data (raw $M_x$, raw $M_y$, decreased $M_z$) to horizontal with pitch and roll obtained from the inertial measurement unit 560 (Block 638).

The horizontal magnetometer components $M_x$ and $M_y$ form a horizontal field component. When graphed in the horizontal plane of $M_x$ as a function of $M_y$, the horizontal field component of the observed magnetic field is characterized as an ellipse. In the calibration, the horizontal component should be "circular" if it has not been distorted by soft and hard iron effects from the vessel 30. Because the magnetometer data has been distorted, however, the horizontal component of the observed magnetic field has been altered and has an offset, rotated, and elliptical shape when graphed in a horizontal plane of $M_x$ and $M_y$. By understanding how the horizontal field's ellipse $M_h$ is distorted from an ideal circular shape, various parameters describing the soft and hard iron effects of the vessel 30 on the magnetometer readings in the horizontal plane can be determined.

Once the magnetometer data is rotated (Block 658), the control unit 510 solves for the parameters of the horizontal field's ellipse $M_h$ simultaneously by least squares (Block 640). Doing this involves solving for two translations ($X_0$ and $Y_0$), an orientation angle (phi), and a ratio (R) of the major to minor axes of the ellipse $M_h$ by which the ideal shape for the magnetometer readings has been distorted in the actual magnetometer data obtained.

The translation $X_0$ is the translation in the X-direction of the horizontal field, and the translation $Y_0$ is the translation in the Y-direction of the horizontal field. These two translations ($X_0$ and $Y_0$) compensate for remnant magnetism (hard iron) in the horizontal. In essence, these translations ($X_0$ and $Y_0$) indicate what offsets to apply to the horizontal field's ellipse $M_h$ after correction for pitch and roll to compensate for the hard-iron's offsetting effects in the horizontal plane. The angle (phi) is the angular orientation of the horizontal field's ellipse $M_h$ in the horizontal, and the ratio (R) is a ratio of the major to minor axes of the horizontal field's ellipse $M_h$. When combined, both the angle (phi) and the ratio (R) compensate for induced magnetism (soft iron) in the horizontal plane.

Then, the process translates and "circles" the horizontal field's ellipse $M_h$—i.e., the process finds what parameters would make the horizontal field's ellipse $M_h$ conform to the ideal circular shape if the magnetometer's data was not subject to distortions from the soft and hard iron effects (Block 642). Here, the process iteratively solves for parameters that define the distortion of the hard and soft iron effects on the magnetometer data by choosing an adjustment factor $M_{z0adj}$ value that minimizes the standard deviation (SD) of the horizontal field ($M_h$) from the ideal.

In particular, the process solves for the translations ($X_0$ and $Y_0$) that shift the horizontal field's ellipse $M_h$ to (0,0) in the $M_x/M_y$ horizontal plane. The process also solves for the angle (phi) that rotates the horizontal field's ellipse $M_h$ so the process can solve for the ratio (R) of the major and minor axis to increase the minor axis to make the ellipse circular. Once the ratio is determined, the process can then rotate the horizontal field's ellipse $M_h$ back by the angle (i.e., –phi) to restore this orientation.

Figure 16A:
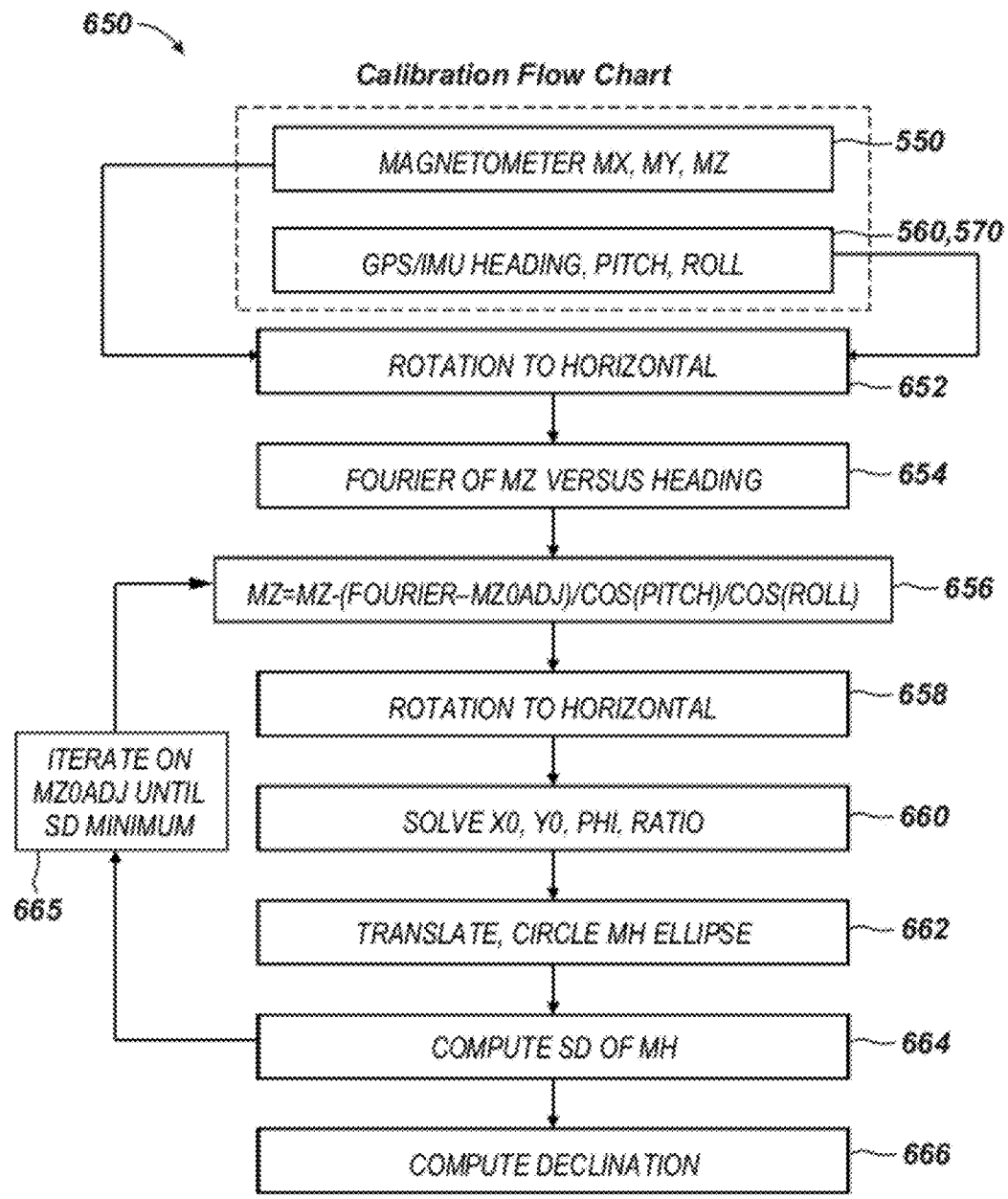
FIGS. 16A-16B shows the calibration process in more detail.

At this point in the iterative process of FIG. 16A, the control unit 510 computes the standard deviation for all data points based on the parameters that have been used for the current iteration of the solution (Block 664). In particular, for all data points, the control unit 510 computes the standard deviation (SD) of the horizontal field's ellipse $M_h$ as the square root of $(M_x^2+M_y^2)$. Then, the control unit 510 chooses the $M_{z0adj}$ adjustment factor that minimizes the standard deviation (SD) of horizontal field's ellipse $M_h$ from the ideal circular shape (Block 665). This value of the $M_{z0adj}$ adjustment factor is associated with the specific parameters of the translations ($X_0$, $Y_0$), rotation angle (phi), and axis ratio (R). There are also nine coefficients of the Fourier series for the vertical component $M_z$. The process then repeats as needed until an optimized declination value is computed for the declination at the location (Block 666).

Figure 18:
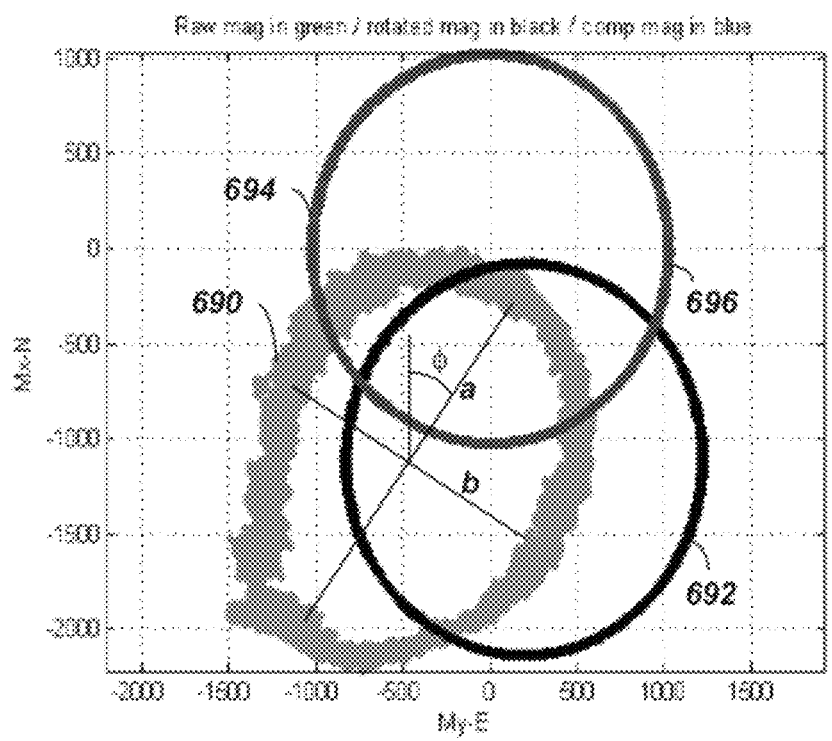
FIG. 18 graphically illustrates the steps for solving parameters of horizontal magnetometer components ($M_x$, $M_y$) simultaneously by least squares to compensate for both hard and soft iron effects in the horizontal plane.

FIG. 18 graphically illustrates these steps. The raw horizontal magnetometer readings $M_x$, $M_y$ are shown by horizontal field's ellipse 690, and the pitch and roll data from the inertial measurement unit 560 is shown by circle 692. If no distortion were present, the magnetometer's horizontal readings $M_x$, $M_y$ if turned through 360° would plot as a circle in the horizontal $M_x/M_y$ plane centered around (0, 0). Of course, external magnetic influences from hard or soft-iron effects distort the magnetometer 550's readings $M_x$, $M_y$ from the ideal. In general, hard-iron effects cause the magnetometer's readings $M_x$, $M_y$ to offset from the center (0, 0). Thus, the raw magnetometer readings $M_x$, $M_y$ are shown as ellipse 690 offset from the center. For its part, the soft-iron effects warp the ideal circle of the readings $M_x$, $M_y$ into a more elliptical shape. Therefore, the raw magnetometer readings $M_x$, $M_y$ are shown by the ellipse 690. Naturally, as both effects can exist concurrently, the resulting readings $M_x$, $M_y$ in the ellipse 690 exhibits both disturbances.

In the calibration calculations, the raw magnetometer data (690) is rotated to horizontal using the pitch and roll data (692) from the IMU device 660. To do this, the steps use translations to shift the ellipse (690) of the raw magnetometer data to (0,0) in the horizontal Mx/My plane and to rotate the ellipse (690) by the angle (phi). The steps also increase the minor axis b of the ellipse (690) by a particular ratio (R) (thus "circling" the ellipse), and rotates the ellipse (690) back by the angle (phi). Finally, the steps solve for the least squares, which is represented by the circle (696). The standard deviation (SD) described previously is represented here as the difference between circle (694 and 696).

d. Second Stage of the Calibration Process

Figure 16C:
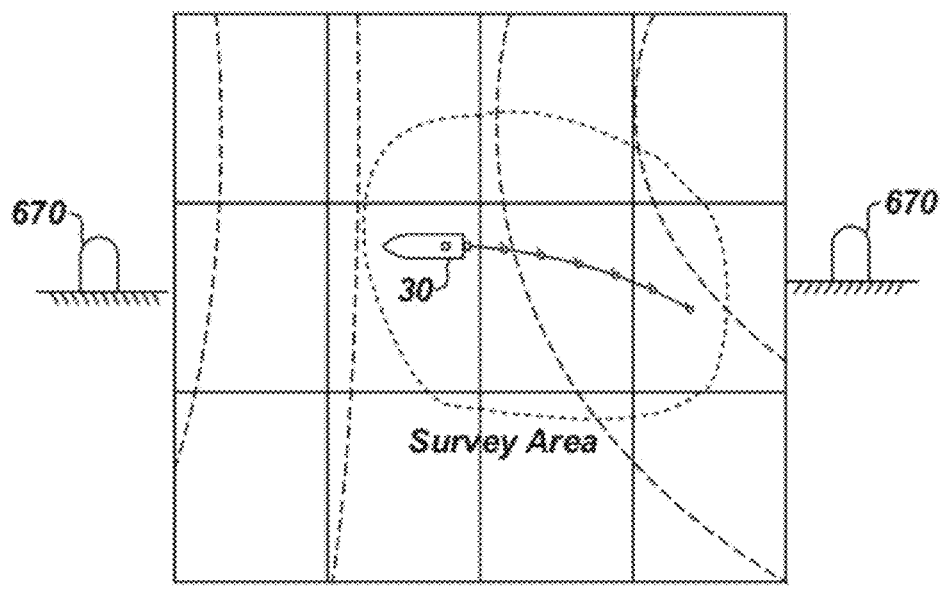
FIG. 16C schematically shows interpolation of the declination for a survey area based on declination from base stations.
Figure 16B:
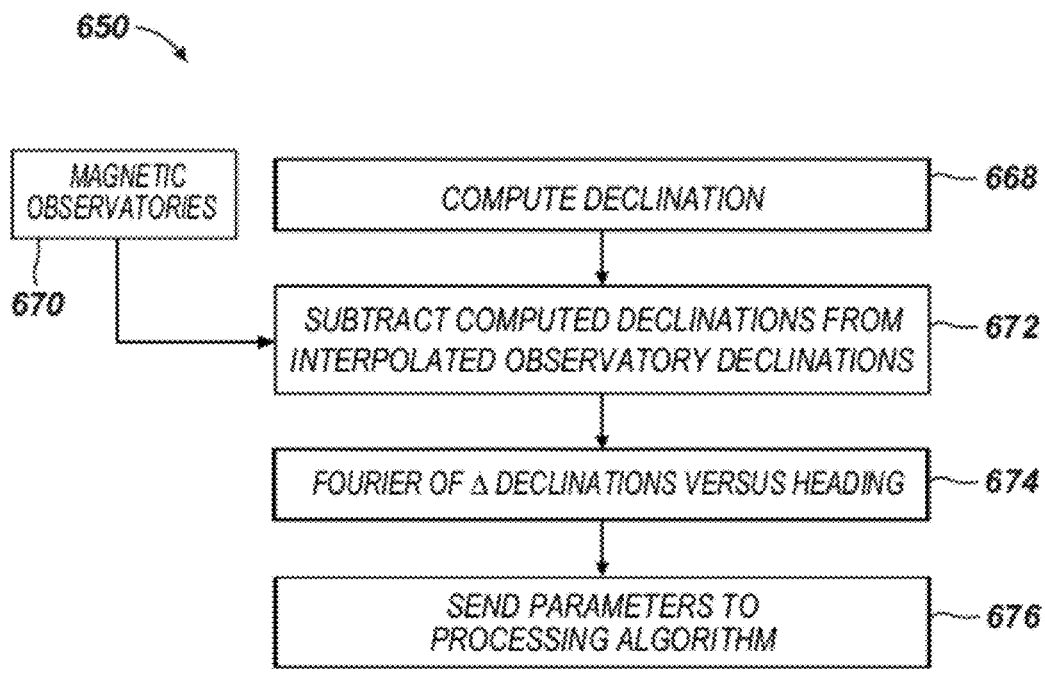

The first calibration stage 660 in FIG. 16A is sufficient to solve for an azimuth with respect to magnetic north. However, the first stage 660 does not compensate for the earth's atmospheric magnetic variation $B_d$. To accomplish this, a second calibration stage is performed as shown in FIG. 16B that interpolates magnetic observatory data using infield referencing to estimate declination during calibration. The steps of the stage 650 can be implemented as software or the like in a programmable processor of a control unit as disclosed herein.

Here, the control unit 510 obtains the 3-component magnetometer data for the day of the calibration from one or more regional magnetic observatories (Block 670). Using a magnetic model (e.g., Enhanced Magnetic Model (EMM) or the like), the predicted declinations for the observatories (670) are then known. For a given calibration location or survey area, several observatories (670) may be available relative to the calibration site for this process.

The control unit 510 subtracts the computed declination (668) from the interpolated observatory declinations (670) (Block 672). FIG. 16C schematically illustrates a vessel 30 in a survey area relative to observatory stations 670. For each of the observatories (670), for example, a time series of a delta-declination can be obtained where the delta declination is the observed declination at the observatory (670) minus the predicted declination for the day. Weighting based on distance from the calibration site (i.e., vessel 30) to the observatories (670) and based on relative strengths of their horizontal magnetic fields, the calibration process interpolates a delta-declination time series for the calibration site (Block 674).

Figure 19:
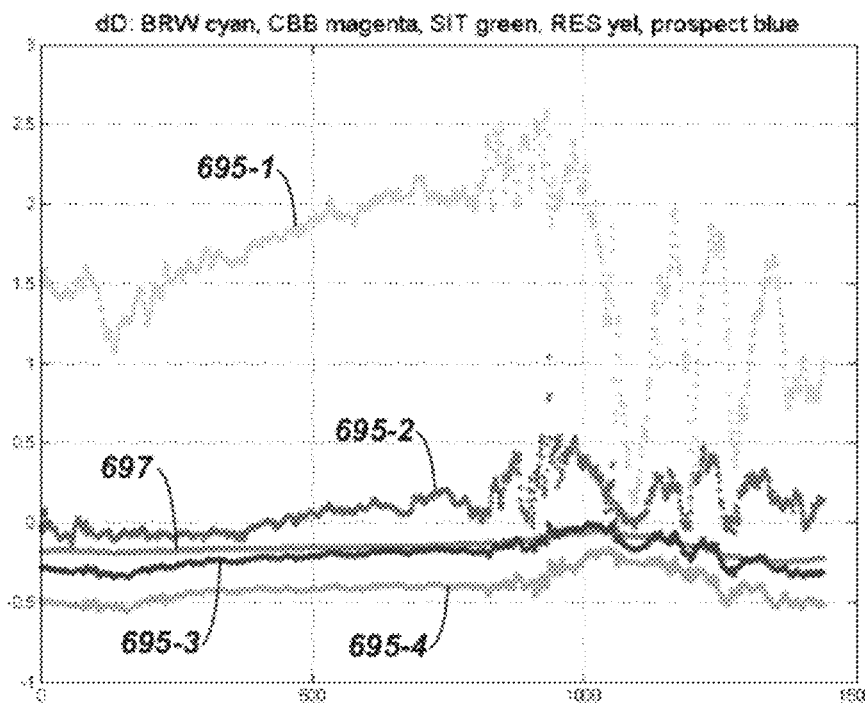
FIG. 19 graphically illustrates the steps for determining a weighted, interpolated delta declination plot for a calibration site.

FIG. 19 graphically illustrates these steps. Delta-declination plots for four observatories are shown by lines $695_{1-4}$. Weighting based on distance from the calibration site (vessel 30) to the observatories (670) and based on relative strengths of their horizontal magnetic fields, the process interpolates a delta-declination time series for the calibration site, which is represented by line 697.

The second calibration stage in FIG. 16B then adds this interpolated delta declination (670) to the predicted declination from the model to produce a time series of declination at the calibration site. As functions of time and magnetic azimuth of the vessel 30, the declinations computed above are then subtracted from the observatory time series to provide a declination adjustment as a function of azimuth (Block 672). This adjustment is solved as a function of magnetic azimuth with a fourth-order Fourier-series deviation curve (also called a "deviation curve") using least squares (Block 674). The result is nine coefficients of the Fourier series for the declination adjustment, which compensate for atmospheric variation in declination at the time and place of the calibration.

Finally, after the calibration calculation, the control unit 510 sends the various declination parameters to be used in processing of data acquired during surveying (Block 676). The parameters include:
- the soft iron parameters—i.e., the 9 coefficients of the Fourier series for vertical component $M_z$ that compensate for induced magnetism (soft iron) in the vertical;
- the hard iron parameters—i.e., the $M_{z0adj}$ adjustment factor, which in combination with Fourier series for the vertical component $M_z$ (above) forms the component $M_{z0}$ to compensate for remnant magnetism (hard iron) in the vertical;
- the translation matrix $X_0$ for translating in the X direction of the horizontal field;
- the translation matrix $Y_0$ for translating in the Y direction of the horizontal field, which with $X_0$ compensates for remnant magnetism (hard iron) in the horizontal;
- the orientation angle (phi) that the horizontal field's ellipse $M_h$ of the magnetometer data has in the horizontal;
- the ratio (R) of the major to minor axes that the horizontal field's ellipse $M_h$ has, which with the angle (phi) compensates for induced magnetism (soft iron) in the horizontal; and
- the nine coefficients of the Fourier series for the declination adjustment (also called a "deviation curve"), which compensates for atmospheric variation in declination at the time and place of the calibration.

2. Processing Flow

Figure 20:
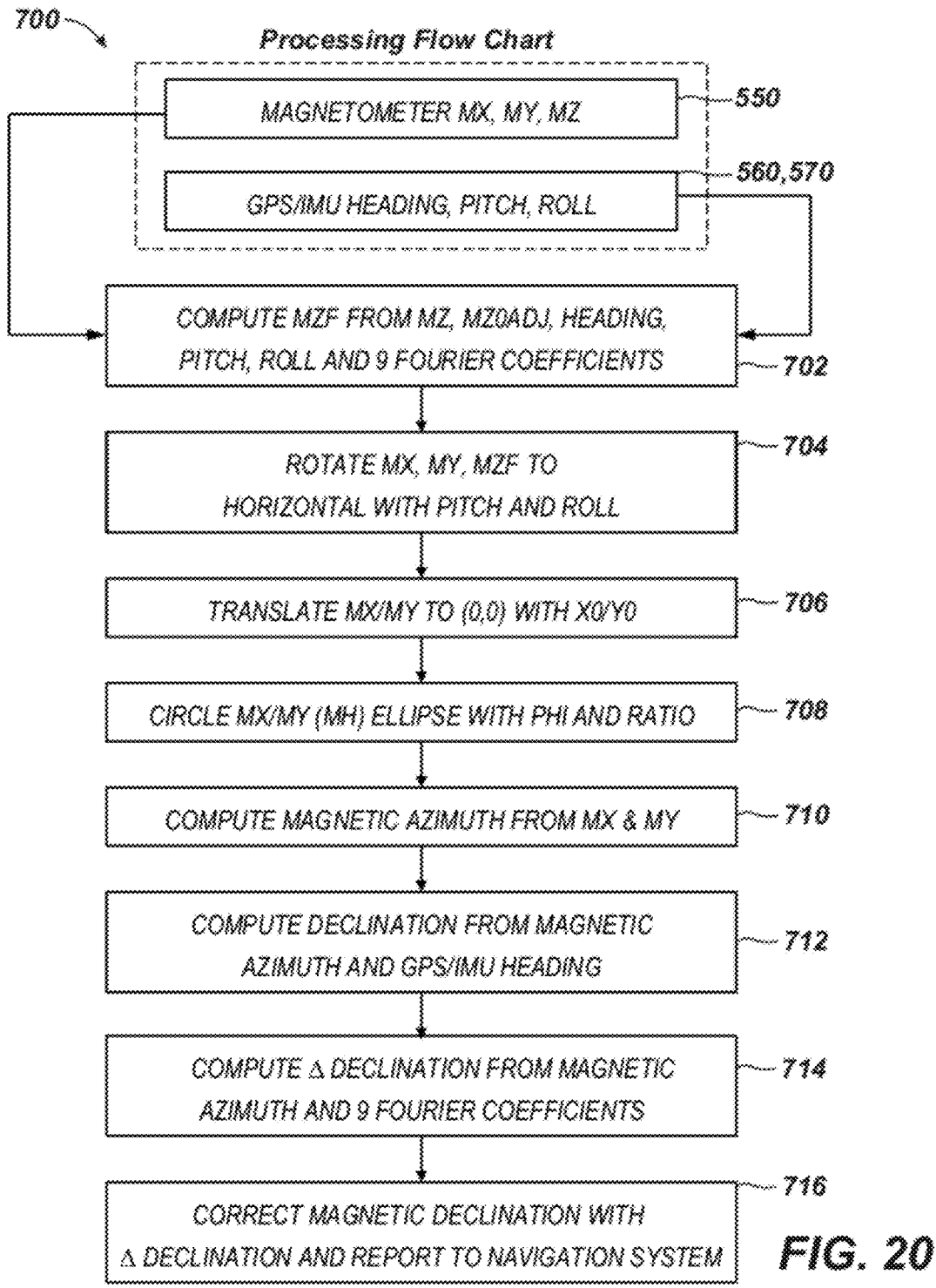
FIG. 20 diagrams processing steps in flow chart form for correcting the declination of cable compass readings from a marine seismic survey.

Having the calibration parameters, the control unit 510 can then process declination data at the vessel 30 to correct the compass readings for current declination. FIG. 20 diagrams this processing in flow chart form and uses many of the same steps as outline previously. As before, the processing can be implemented as software or the like in a programmable processor of a control unit as disclosed herein. Here, the processing uses the previous declination parameters determined through calibration to determine a correct magnetic declination of cable compasses and sensors and to report to the control system's navigation components.

Initially, the control unit 510 computes $M_{zF}$ from the raw azimuth $M_z$, $M_{z0adj}$, heading, pitch, roll and nine Fourier coefficients of the vertical soft iron parameters (Block 702) and rotates $M_x$, $M_y$, $M_{zF}$ to horizontal with pitch and roll (Block 704). The unit 510 translates the horizontal components $M_x/M_y$, (i.e., the horizontal field's ellipse $M_h$) to (0,0) with the transformations $X_0$ and $Y_0$ (Block 706) and circles the horizontal field's ellipse $M_h$ with the previously determined angle (phi) and ratio (R) (Block 708). The control unit 510 then computes the magnetic azimuth from $M_x$ and $M_y$ (Block 710) and computes the declination from the magnetic azimuth and the GPS/IMU heading (Block 712).

To finish the second part of the process and account for magnetic atmospheric variations $B_d$, the control unit 510 computes the delta-declination from magnetic azimuth and the nine Fourier coefficients for the atmospheric correction (Block 714). Finally, the control unit 510 corrects magnetic declination with delta-declination and reports the result to the navigation system for controlling the streamers 60 and for recording for later processing in correcting the cable compass readings as detailed herein (Block 716).

D. Declination Correction for Land-Based Seismic Survey

As disclosed herein, the declination system can be used in marine seismic surveys, and especially in surveys where it is impractical to attach tail buoys to the end of streamer cables, such as in ice covered areas, in congested areas, and in applications where the cable is towed too deep for practical connection to a tail buoy (deep tow geometry, slanted cable geometry, etc). However, the declination system can be used in other situations. In general, the disclosed system can be used in marine seismic surveys where additional precision is required from the compasses or other magnetic heading sensors, even though there may be no hindrance to having a tail buoy for obtaining GPS readings in a closed traverse. The disclosed system can also be used in marine seismic surveys where the survey crosses a wide expanse in which magnetic declination is expected to change or where environmental conditions indicate fluctuations in declination.

Rather than marine applications, the declination system can further be used in multi-component land surveys where the main orientation sensor is a compass or other magnetic heading sensor and can be used at times when the earth's magnetic field is in a state of extreme change either spatially or temporally over time (e.g., at arctic latitudes or during solar storms). Thus, the disclosed system can be used in seismic data acquisition to measure the real-time magnetic declination of a particular area. Moreover, the disclosed system can be used in both land and marine seismic surveys to be applied to any magnetic heading device for correction to true north and can be used to compensate for the magnetic influence of a marine-based or land-based device, such as a steel platform, a vessel, a vehicle, or the like. In one example, rather than a marine-based vessel, a land-based vehicle can have a magnetometer, navigation device, and controller comparable to those disclosed above for marine surveying albeit for land surveying.

Figure 21:
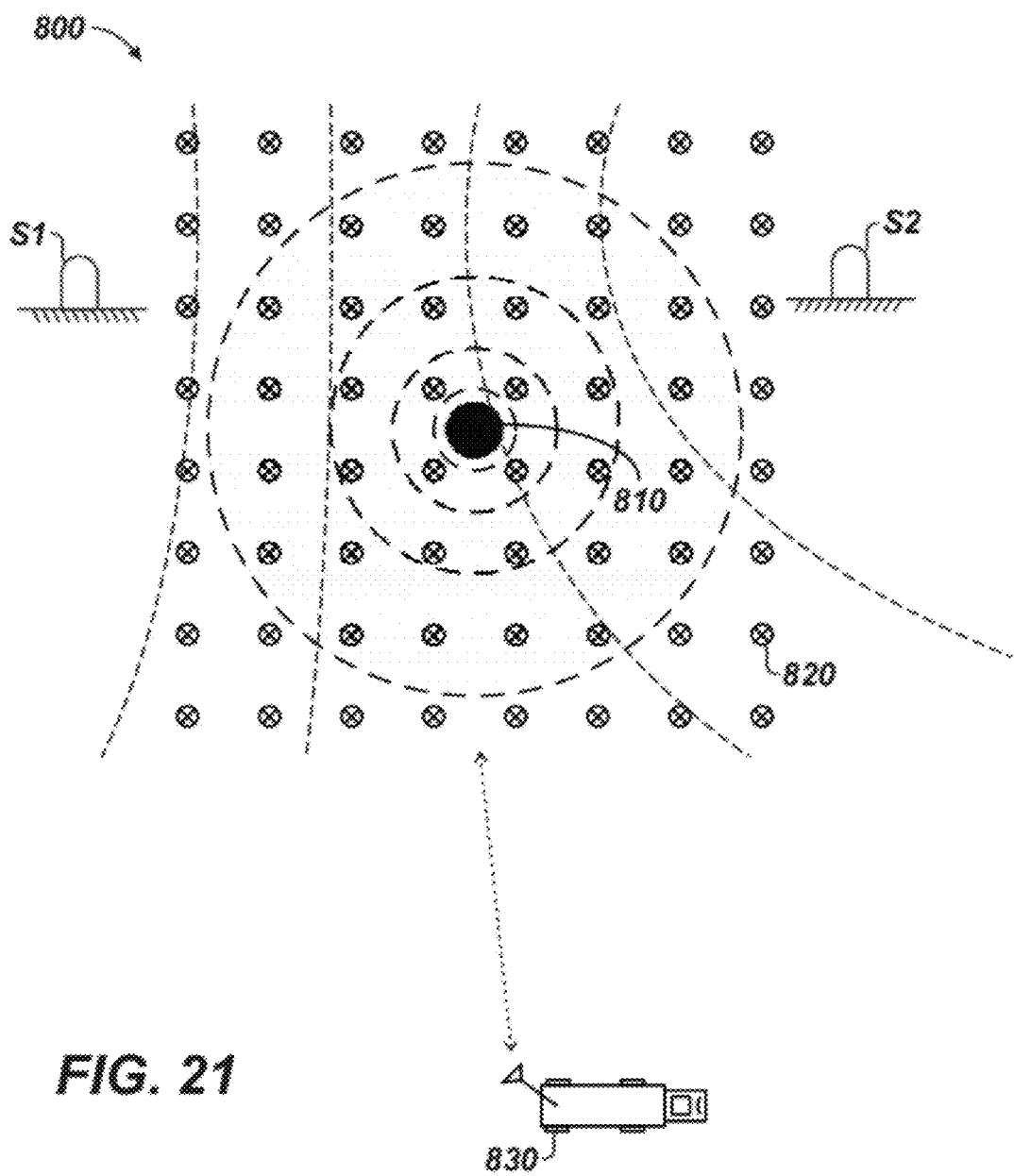
FIG. 21 schematically shows a land-based seismic survey system according to the present disclosure.

As another example, FIG. 21 schematically shows a plan view of a land-based seismic survey system 800 having a source 810, a plurality of sensors 820, and a central controller 830. Spaced in array to measure geophysical information, the sensors 820 can use 3-component sensors for obtaining 3-dimensional energy known as 3D seismic and can include accelerometers, velocity geophones, microphones, or the like. In use, the seismic source 810 imparts acoustic energy into the ground, and the sensors 820 receive energy after reflection and refraction at boundaries in subsurface structures. The central controller 830 receives the seismic information and processes it so image information can be generated.

As shown, various isogonic lines of the geomagnetic field's declination may pass through the survey area. These isogonic lines are typically expressed in degrees for correcting compass readings to true north. The degrees of the isogonic lines change over the geographic location and also change over time. Therefore, geomagnetic field measurements from compasses or the like associated with each of the sensors 820 may have errors due to fluctuations in declination. For this reason, the system 800 uses the techniques disclosed herein for obtaining the declination both temporally and spatially for the various sensor locations so the associated geomagnetic field measurements can be corrected and the corrected measurements can provide better correlated information for imaging.

As also shown, declination at the sensors 820 can be determined by interpolation from one or more remote base stations S1-S2 so that spatial and temporal corrections for declinations can be calculated for the various sensor locations using infield referencing as detailed previously. Additionally or in the alternative, declination at the sensors 820 can be individually calculated using a declination system and techniques as disclosed herein so that individual geomagnetic readings at the different sensor locations can be corrected in real time for declination.

The techniques of the present disclosure can be implemented in digital electronic circuitry, or in computer hardware, firmware, software, or in combinations of these. Apparatus for practicing the disclosed techniques can be implemented in a computer program product tangibly embodied in a machine-readable storage device for execution by a programmable processor; and method steps of the disclosed techniques can be performed by a programmable processor executing a program of instructions to perform functions of the disclosed techniques by operating on input data and generating output. Suitable processors include, by way of example, both general and special purpose microprocessors. Generally, the processor receives instructions and data from a read-only memory and/or a random access memory, including magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. The teachings of the present disclosure can apply to 2-D, 3-D, and 4-D seismic surveying in icy or obstructed waters, as well under normal marine seismic conditions. Although described for offshore use, the magnetic declination correction to true north disclosed herein can be used in both land and marine seismic surveys. Moreover, aspects and techniques discussed in conjunction with one particular embodiment, implementation, or arrangement disclosed herein can be used or combined with aspect and techniques discussed in others disclosed herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A seismic survey method, comprising:
   calibrating a declinometer on a vessel in an observed magnetic field of a survey area by compensating for atmospheric magnetic variation in the observed magnetic field of the survey area and determining distortion in geomagnetic calibration measurements of the observed magnetic field caused by soft iron effect of the vessel;
   obtaining one or more seismic signals over a temporal period and over a spatial region with one or more seismic sensors in a seismic survey of the survey area by towing at least one streamer having the one or more seismic sensors behind the vessel in a traverse;
   obtaining one or more local geomagnetic field measurements relative to the one or more seismic sensors, the one or more local geomagnetic field measurements subject to variations in declination over the temporal period and over the spatial region;
   measuring temporal and spatial declination parameters by obtaining vessel measurements, including position measurements and geomagnetic field measurements, at the vessel using the calibrated declinometer and determining, from the vessel measurements, the variations in the declination at the vessel over the temporal period and over the spatial region during the seismic survey;
   compensating, in the determined variations, at least for the soft iron effect of the vessel by correcting for the determined distortion in the geomagnetic field measurements obtained at the vessel;
   correcting, over the temporal period and over the spatial region, the one or more local geomagnetic field measurements based on the temporal and spatial declination parameters compensated at least for the soft iron effect; and
   correlating, over the temporal period and over the spatial region, the one or more corrected geomagnetic field measurements with the one or more seismic signals.

2. The method of claim 1, wherein measuring the temporal and spatial declination parameters comprises obtaining one or more base geomagnetic field measurements from one or more base locations and interpolating the temporal and spatial declination parameters based thereon.

3. The method of claim 2, wherein the one or more base locations are spatially separate from the one or more local geomagnetic field measurements, and wherein the one or more base geomagnetic field measurements are obtained over time.

4. The method of claim 1, wherein measuring the temporal and spatial declination parameters comprises obtaining global positioning system measurements as the position measurements of the vessel and determining a first geodetic bearing of the vessel from the global positioning system measurements at the vessel.

5. The method of claim 4, wherein measuring the temporal and spatial declination parameters comprises determining a second geodetic bearing of the vessel from the geomagnetic field measurements at the vessel.

6. The method of claim 5, wherein determining the variations in the declination at the vessel over the temporal period and over the spatial region during the seismic survey from the vessel measurements comprises calculating a difference between the first and second geodetic bearings.

7. The method of claim 1, wherein obtaining the one or more local geomagnetic field measurements relative to the one or more seismic sensors comprises obtaining one or more compass readings on the at least one streamer.

8. The method of claim 1, wherein calibrating the declinometer on the vessel comprises traversing a calibration pattern with the declinometer in the survey area.

9. The method of claim 1, wherein calibrating the declinometer on the vessel comprises supplementing the calibration with one or more predicted declinations of the survey area interpolated from one or more base stations.

10. The method of claim 1, wherein compensating comprises compensating for soft and hard iron parameters of the vessel for vertical and horizontal planes in the geomagnetic field.

11. The method of claim 10, wherein compensating for the soft and hard iron parameters of the vessel for the vertical and horizontal planes in the geomagnetic field comprises simultaneously solving for the soft and hard iron parameters in a least-squares adjustment.

12. The method of claim 1, wherein towing the at least one streamer in the traverse comprises towing the at least one streamer in an open traverse.

13. The method of claim 12, further comprising:
at least intermittently tracking an absolute position of the at least one streamer; and
correlating the one or more corrected geomagnetic field measurements with the absolute position.

14. The method of claim 13, wherein at least intermittently tracking the absolute position of the at least one streamer comprising intermittently
bringing a device on the at least one streamer toward the surface, and
obtaining absolute position information of the at least one streamer with the device while brought toward the surface.

15. The method of claim 14, wherein tracking the absolute position of the at least one streamer comprises:
obtaining relative position information of the at least one streamer while towed under the surface of the water; and
determining the absolute position of the at least one streamer using the relative position information and the intermittently obtained absolute position information.

16. The method of claim 1, wherein determining the variations in the declination at the vessel over the temporal period and over the spatial region during the seismic survey from the vessel measurements comprises compensating for motion of the vessel obtained from three-component inertial measurements of the vessel.

17. The method of claim 1, wherein measuring the temporal and spatial declination parameters comprises measuring the temporal and spatial declination parameters in real time in the seismic survey.

18. The method of claim 1, wherein determining the distortion in the geomagnetic calibration measurements of the observed magnetic field caused by the soft iron effect of the vessel comprises determining elliptical and angular distortion in a horizontal component of the geomagnetic calibration measurements; and wherein correcting for the determined distortion in the geomagnetic field measurements comprises correcting for the determined elliptical and angular distortion in the horizontal component of the geomagnetic field measurements.

19. The method of claim 1, wherein determining the distortion in the geomagnetic calibration measurements of the observed magnetic field caused by the soft iron effect of the vessel comprises determining an offset in a vertical component of the geomagnetic calibration measurements; and wherein correcting for the determined distortion in the geomagnetic field measurements comprises correcting for the determined offset in the vertical component of the geomagnetic field measurements.

20. A programmable storage device having program instructions stored thereon for causing a programmable control device to perform a method of ice threat monitoring method for a target marine structure, the method comprising:
calibrating a declinometer on a vessel in an observed magnetic field of a survey area by compensating for atmospheric magnetic variation in the observed magnetic field of the survey area and determining distortion in geomagnetic calibration measurements of the observed magnetic field caused by soft iron effect of the vessel;
obtaining one or more seismic signals over a temporal period and over a spatial region with one or more seismic sensors in a seismic survey of the survey area by towing at least one streamer having the one or more seismic sensors behind the vessel in a traverse;
obtaining one or more local geomagnetic field measurements relative to the one or more seismic sensors, the one or more local geomagnetic field measurements subject to variations in declination over the temporal period and over the spatial region;
measuring temporal and spatial declination parameters by obtaining vessel measurements, including position measurements and geomagnetic field measurements, at the vessel using the calibrated declinometer and determining, from the vessel measurements, the variations in the declination at the vessel over the temporal period and over the spatial region during the seismic survey;
compensating, in the determined variations, at least for the soft iron effect of the vessel by correcting for the determined distortion in the geomagnetic field measurements obtained at the vessel;
correcting, over the temporal period and over the spatial region, the one or more local geomagnetic field measurements based on the temporal and spatial declination parameters compensated at least for the soft iron effect; and
correlating, over the temporal period and over the spatial region, the one or more corrected geomagnetic field measurements with the one or more seismic signals.

21. A seismic data acquisition apparatus for a vessel towing a seismic streamer in a survey area behind the vessel in a seismic survey, the apparatus comprising:
at least one seismic sensor towed in a traverse behind the vessel on the seismic streamer and measuring one or more seismic signals in the survey area over a temporal period and over a spatial region;
at least one geomagnetic heading device associated with the at least one seismic sensor and towed behind the vessel on the seismic streamer, the at least one geomagnetic heading device making one or more local geomagnetic field measurements, the one or more local geomagnetic field measurements subject to variations in declination over the temporal period and over the spatial region;
a declinometer having a positioning device and at least one magnetometer disposed on the vessel, the positioning device obtaining position measurements at the vessel, the at least one magnetometer making magnetometer measurements at the vessel;
a controller operatively coupled to the at least one seismic sensor, the at least one geomagnetic heading device, and the declinometer having the positioning device and the at least one magnetometer, the controller configured to:
compensate for atmospheric magnetic variation in the observed magnetic field of the survey area to calibrate the declinometer in a survey area;
determine distortion in geomagnetic calibration measurements of an observed magnetic field caused by soft iron effect of the vessel to calibrate the declinometer in the survey area;
determine temporal and spatial declination parameters from the variations in the declination at the vessel over the temporal period and over the spatial region based on the position measurements and the magnetometer measurements of the calibrated declinometer at the vessel;

correct for the determined distortion in the geomagnetic field measurements to compensate, in the determined variations, at least for the soft iron effect of the vessel on the geomagnetic field measurements obtained at the vessel;

correct the one or more local geomagnetic field measurements over the temporal period and over the spatial region based on the declination parameters compensated at least for the soft iron effect; and correlate the one or more corrected geomagnetic field measurements over the temporal period and over the spatial region with the one or more seismic signals.

* * * * *